United States Patent
Torii et al.

(10) Patent No.: US 10,068,163 B2
(45) Date of Patent: *Sep. 4, 2018

(54) IMAGE PROCESSING APPARATUS AND NON-TRANSITORY COMPUTER READABLE MEDIUM USING DIFFERENCE IN PROCESSING SPEED INFORMATION

(71) Applicant: FUJI XEROX CO., LTD., Tokyo (JP)

(72) Inventors: Takeshi Torii, Kanagawa (JP); Hisao Komazawa, Kanagawa (JP); Takashi Kondo, Kanagawa (JP); Kazuhiro Okawa, Kanagawa (JP); Yoshinobu Nakamura, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/614,938

(22) Filed: Feb. 5, 2015

(65) Prior Publication Data

US 2015/0227824 A1    Aug. 13, 2015

(30) Foreign Application Priority Data

Feb. 13, 2014 (JP) ................. 2014-025642

(51) Int. Cl.
G06K 15/02 (2006.01)
G06K 15/12 (2006.01)
G06K 15/00 (2006.01)

(52) U.S. Cl.
CPC ....... G06K 15/407 (2013.01); G06K 15/1823 (2013.01)

(58) Field of Classification Search
CPC .......... G06K 15/1807; G06K 15/1813; G06K 15/1823; G06K 15/1861; G06K 15/1878;
(Continued)

(56) References Cited

U.S. PATENT DOCUMENTS 5,274,469 A   12/1993  Small et al.
5,708,917 A *  1/1998  Kawai ............... G03G 15/0849
                                                  399/42

(Continued)

FOREIGN PATENT DOCUMENTS

JP    H0612487 A    1/1994
JP    2005258959 A  9/2005
(Continued)

OTHER PUBLICATIONS

Oct. 17, 2017 Office Action issued in JP Application No. 2014-025642.

(Continued)

*Primary Examiner* — Benny Q Tieu
*Assistant Examiner* — Juan M Guillermety
(74) *Attorney, Agent, or Firm* — Oliff PLC

(57) ABSTRACT

Provided is an image processing apparatus including a print image generation section that generates print image data to be supplied to a printing device by executing a rasterizing process with a resolution for printing on print data, and an image density calculation section that executes the rasterizing process on the print data with a resolution lower than the resolution for printing and calculates image density information used in control of an image forming process in the printing device based on raster image data which is generated through the rasterizing process and has a resolution lower than the resolution for printing, wherein a difference in a processing speed between the print image generation section and the image density calculation section causes the image density information of a page prior to a page of the print image data being printed by the printing device to be supplied to the printing device.

20 Claims, 11 Drawing Sheets

(58) Field of Classification Search
CPC ............. G06K 15/129; G06K 15/1843; G06K 15/1817; G06K 15/1836; G06K 15/407; G06K 9/6857; G06K 15/1223; G06K 2215/0037; G06K 2215/0057; G03G 15/0848; G03G 15/0849; G03G 15/0856; G03G 2215/00029; G03G 2215/00037; G03G 2215/00063
USPC .............. 358/1.12, 1.13, 1.15, 1.16, 1.2, 1.9
See application file for complete search history.

(56) References Cited

U.S. PATENT DOCUMENTS

| | | | | |
|---|---|---|---|---|
| 6,731,401 | B1 * | 5/2004 | Kakutani | G06K 15/1817 358/1.16 |
| 6,977,752 | B1 * | 12/2005 | Barry | G03G 15/0856 358/1.9 |
| 8,384,936 | B2 * | 2/2013 | Isshiki | H04N 1/40068 358/1.2 |
| 2003/0210413 | A1 * | 11/2003 | Takeda | H04N 1/00002 358/1.12 |
| 2005/0231748 | A1 * | 10/2005 | Lee | G06K 15/1823 358/1.13 |
| 2009/0116073 | A1 * | 5/2009 | Nakamura | H04N 1/00002 358/3.23 |
| 2009/0161133 | A1 * | 6/2009 | Nakamura | H04N 1/4078 358/1.9 |
| 2009/0202263 | A1 * | 8/2009 | Yoshida | G03G 15/0131 399/49 |
| 2011/0286046 | A1 * | 11/2011 | Ohsugi | G06K 15/027 358/3.01 |
| 2013/0120765 | A1 * | 5/2013 | Wozniak | G06K 15/1868 358/1.2 |
| 2013/0155426 | A1 * | 6/2013 | Achiwa | G06K 15/1867 358/1.9 |
| 2013/0164002 | A1 * | 6/2013 | Tanaka | G03G 15/0849 399/30 |
| 2013/0194616 | A1 * | 8/2013 | Abel | G06K 15/1861 358/1.15 |
| 2013/0321873 | A1 * | 12/2013 | Ido | G06K 15/1878 358/3.27 |

FOREIGN PATENT DOCUMENTS

JP 2013-140554 A 7/2013
JP 2013-195868 A 9/2013

OTHER PUBLICATIONS

Jan. 9, 2018 Office Action issued in Japanese Patent Application No. 2014-025642.

* cited by examiner

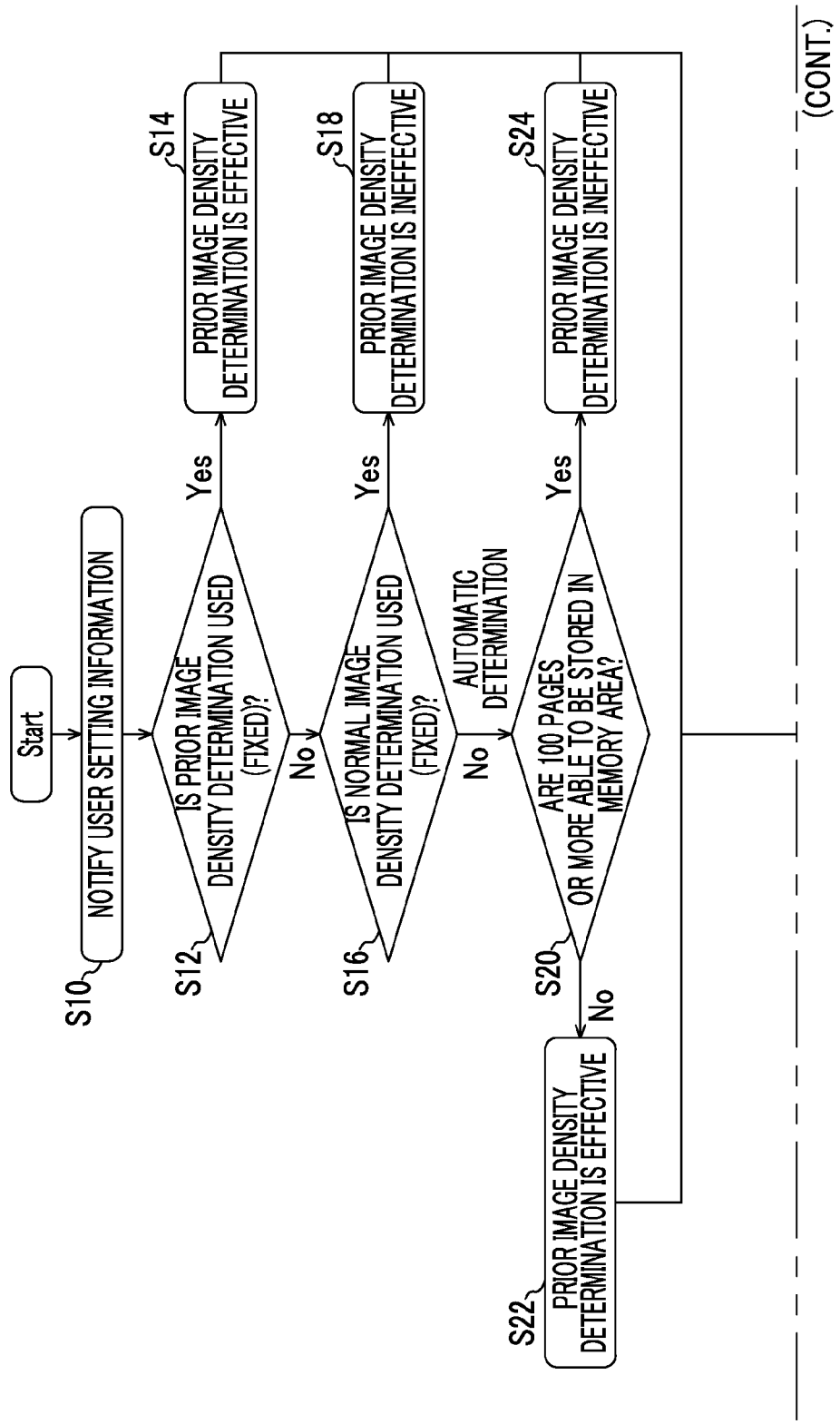

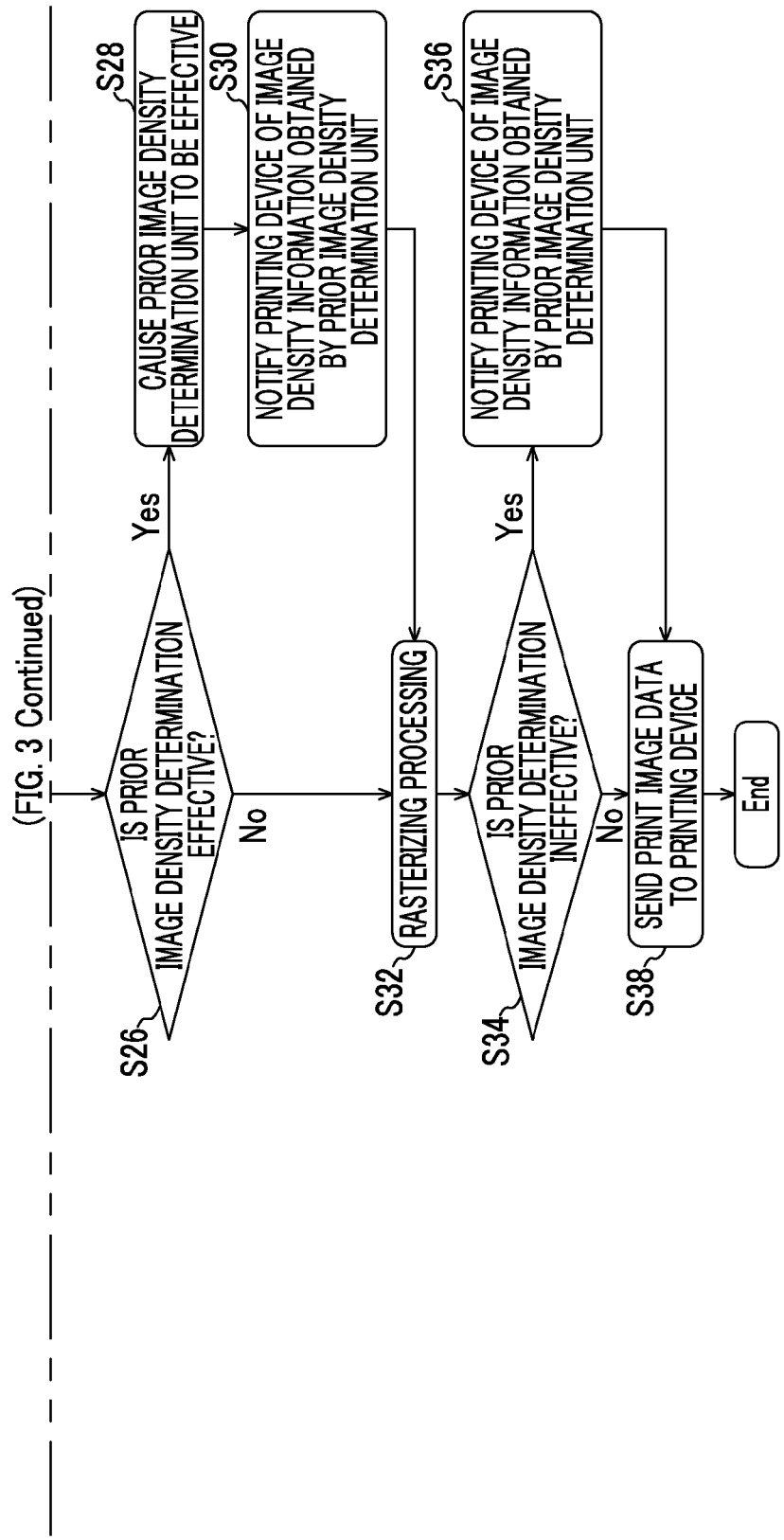

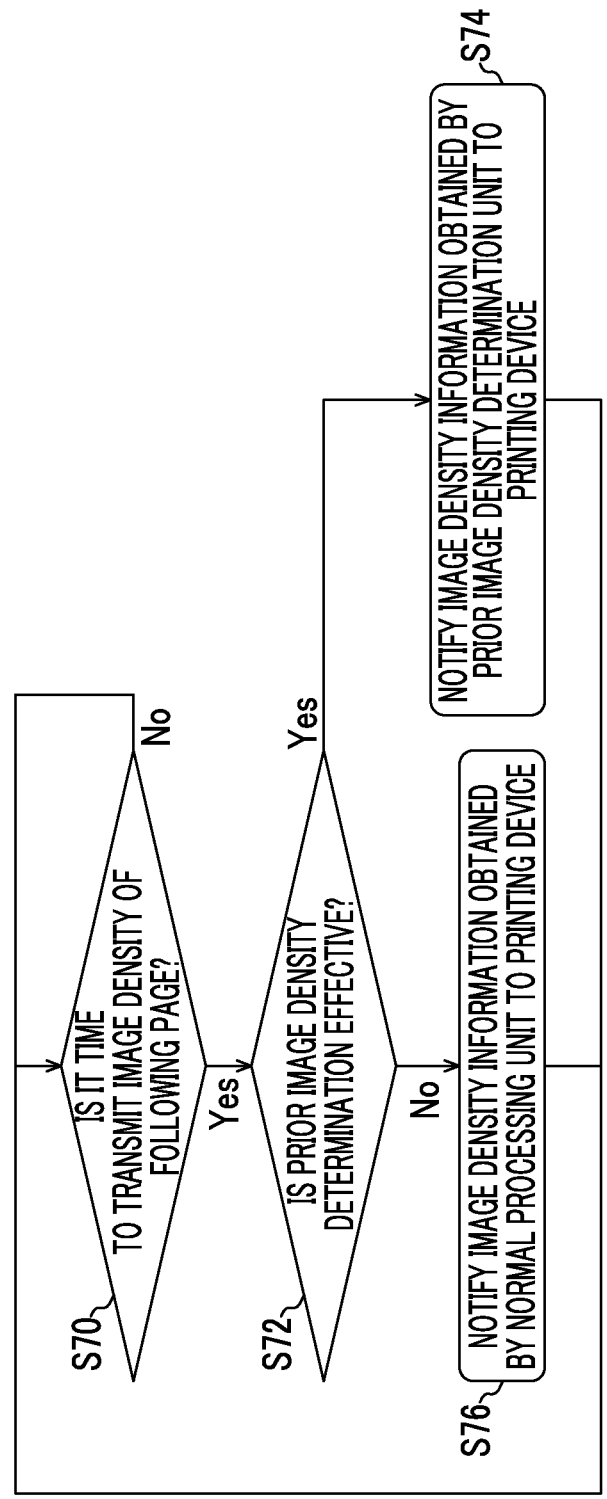

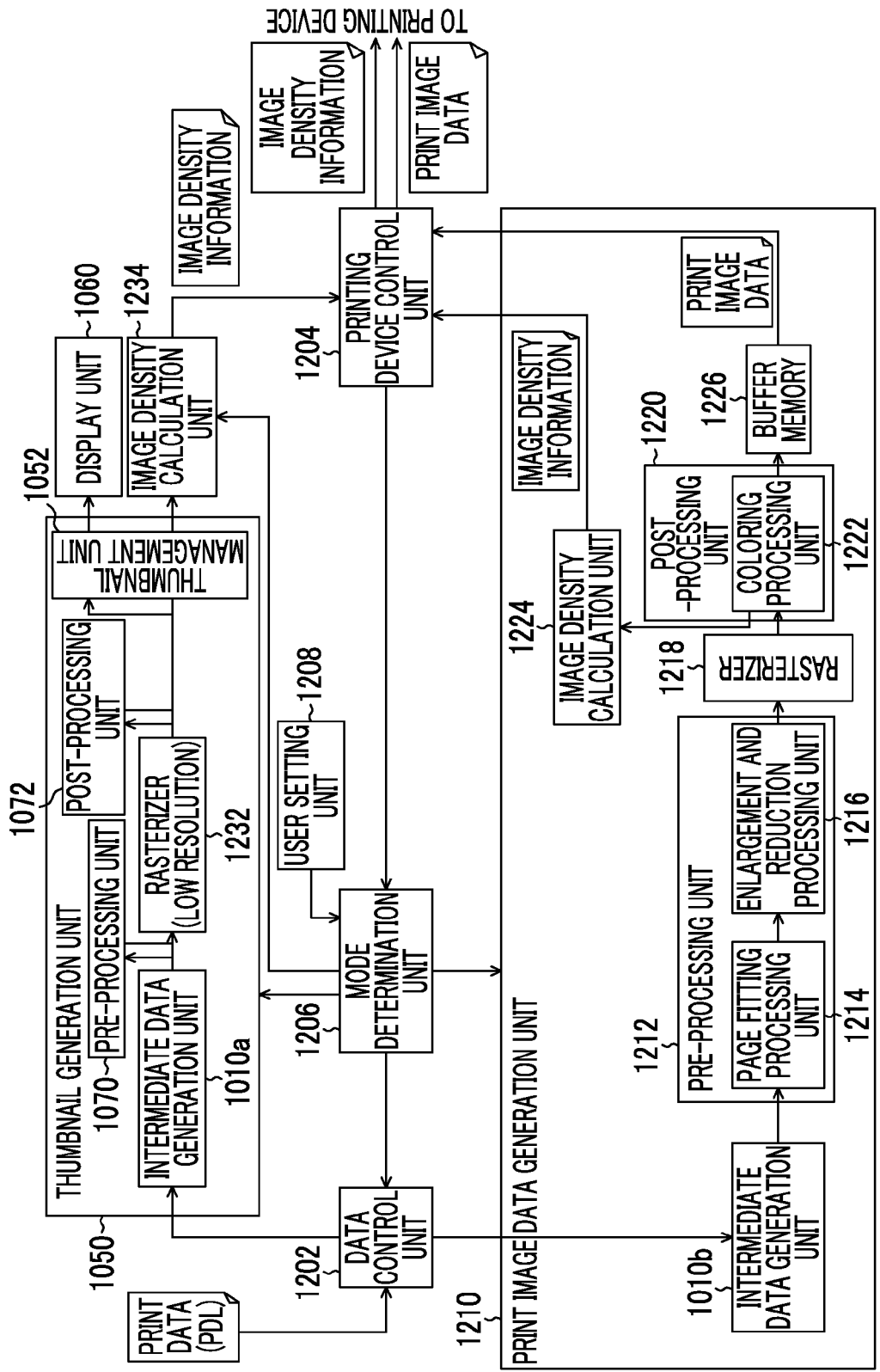

IMAGE PROCESSING APPARATUS AND NON-TRANSITORY COMPUTER READABLE MEDIUM USING DIFFERENCE IN PROCESSING SPEED INFORMATION

CROSS-REFERENCE TO RELATED APPLICATIONS

This application is based on and claims priority under 35 USC 119 from Japanese Patent Application No. 2014-025642 filed Feb. 13, 2014.

BACKGROUND (i) Technical Field

The present invention relates to an image processing apparatus and a non-transitory computer readable medium.

(ii) Related Art

In an image forming apparatus using an electrophotographic process, control of calculating the number of pixels of an image to be printed and of replenishing a toner to a developing device in accordance with the calculated number of pixels is performed. This control is referred to as an image count dispense control (ICDC) type. When PDL data described in a page description language (PDL) is printed, the image forming apparatus generates image data to be printed by rasterizing the PDL data (converts the PDL data into data in a raster format) and performing a process such as a page fitting process, an enlargement and reduction, and a color space conversion to print the generated image data on a paper. The number of pixels of this image data is calculated and the calculated number of pixels is used for control of toner replenishing. The number of pixels obtained by using the ICDC process represents image density or image concentration of an image.

In the related art, toner replenishing control is performed based on an average of image density in the most recently printed pages of a predetermined number (for example, from tens of pages to hundreds of pages). However, this process is not suitable for print data in which image density is rapidly changed between pages. For example, when images having relatively low image density continue to a certain page and then pages having very high image density continue, toner replenishing may be insufficient at the first page of a group of the pages having high image density. In this case, if a toner supply amount is increased unexpectedly corresponding to a rapid increase in image density at a boundary between a low image density page and a high image density page, a fresh toner in the developing device is suddenly increased and thus unexpected color shift occurs.

As measures for this, it is considered that a buffer memory capable of holding several pages of print image data is prepared and sequentially generated print image data of each page is stored in the buffer memory in a first-in and first-out manner to be read and printed. In this process, a time difference from when print image data of a page is generated to when the print image data is printed on a paper may occur by the number of pages corresponding to the capacity of the buffer memory. Accordingly, image density of a page may be acquired earlier than the time difference from a point in time at which the page is printed and toner replenishing may be controlled such that an amount of a toner in a developing device is sufficient at the time when the page is actually printed. A control unit for toner replenishing detects a rapid change prior to the time difference from when a page having the rapidly changed image density is to be printed and causes a toner supply amount to be smoothed and changed to a certain extent during, for example, the time difference. Accordingly, an occurrence of unexpected color shift may be reduced or prevented.

There is an image forming system printing thousands of pages each minute among the recent high-end image forming systems. In such a high speed type, it is necessary to acquire image density of a page from tens of pages to hundreds of pages before the currently printed page in advance in order to obtain a time difference allowable for handling a delay of the toner supply control or rapid change in the toner supply amount. Accordingly, a buffer memory having a large enough capacity for holding print image data of tens of pages to hundreds of pages or more is necessary for applying the above-described process using the buffer memory. For example, a print speed of 2000 pages per minute corresponds to approximately 33 pages per second. If image density of print image data is necessary for control three seconds prior to a time of printing, a memory capacity large enough for buffering images of approximately 100 pages is necessary. For example, when high resolution printing such as 600 dpi and 1200 dpi is performed in a full color manner, the buffer memory having a capacity of tens of gigabytes to hundreds of gigabytes is required. Providing a memory having such a large capacity requires a large cost.

Even if the system has a buffer memory having a large capacity, a delay of time for which print image data of at least tens of pages to hundreds of pages is generated occurs in a time from when printing is instructed to when the first page is printed and output.

In the above description, toner supply control is described as a representative example. However, if the image density is acquired before the image is actually printed, many types of control may be performed in accordance with image density of an image among various types of control for other components (for example, temperature control of a fixing machine, correction of unevenness in a surface, and the like) in an image forming process of printing. There is also a problem in a case of such control of components, similarly to a case of toner supply control.

SUMMARY

According to an aspect of the invention, there is provided an image processing apparatus including:

a print image generation section that generates print image data to be supplied to a printing device by executing a rasterizing process with a resolution for printing on print data; and an image density calculation section that executes the rasterizing process on the print data with a resolution lower than the resolution for printing and calculates image density information used in control of an image forming process in the printing device based on raster image data which is generated through the rasterizing process and has a resolution lower than the resolution for printing, wherein a difference in a processing speed between the print image generation section and the image density calculation section causes the image density information of a page prior to a page of the print image data being printed by the printing device to be supplied to the printing device.

BRIEF DESCRIPTION OF THE DRAWINGS

Exemplary embodiments of the present invention will be described in detail based on the following figures, wherein:

FIG. 3 is a diagram illustrating an example of processing procedures of the rasterizing device;

FIG. 9 is a diagram illustrating an example of procedures of switching image density information that is obtained by one of a normal processing unit and a prior image density determination unit and is transferred, based on a determination result of effectiveness and ineffectiveness in prior image density determination; and FIG. 10 is a diagram illustrating a systematic configuration of a fifth modification example.

DETAILED DESCRIPTION

Figure 1:
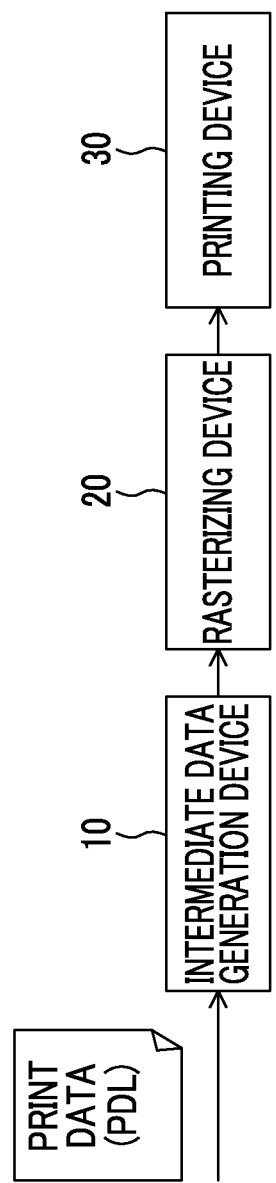
FIG. 1 is a diagram illustrating an example of a system to which a type according to an exemplary embodiment is applied.

First, an example of the entire configuration of a printing system according to an exemplary embodiment will be described with reference to FIG. 1. The printing system illustrated in FIG. 1 includes an intermediate data generation device 10, a rasterizing device 20, and a printing device 30.

PDL data is input to the intermediate data generation device 10 through a network from a client computer (not illustrated) or through a portable storing medium such as a CD-R. The PDL data is data obtained by describing an image of each page to be printed in a page description language (PDL). A type of PDL is not particularly limited. A data format such as the portable document format (PDF), in which a printable image is represented, may be also understood as a type of PDL.

The intermediate data generation device 10 translates the input PDL data to generate intermediate data. The intermediate data refers to data obtained by expressing an image of each page represented by the PDL data in an intermediate data format. The intermediate data format refers to a data format for expressing an image with intermediate granularity between the page description language and a raster format. Generally, an image object described in the PDL is expressed by segmentalizing the image object into minute components having further simple shapes in the intermediate data format. As an example of the intermediate data format, for example, a display list has been known well. Technologies in the related art may be used as a converting process from the PDL into the intermediate data format, that is executed by the intermediate data generation device 10 and thus the description of the converting process will be omitted.

The rasterizing device 20 generates image data of each page to be printed in the raster format that is able to be received by the printing device 30 by rasterizing intermediate data input from the intermediate data generation device 10 (converting into the raster format). Hereinafter, image data in the raster format supplied to the printing device 30 is referred to as print image data. The rasterizing device 20 inputs the generated print image data of each page to the printing device 30. The rasterizing device 20 controls the printing device 30 to perform printing by transmitting and receiving information to and from the printing device 30.

The printing device 30 prints print image data input from the rasterizing device 20 on a medium such as a paper. In this example, the printing device 30 performs printing through an electrophotographic process. That is, the printing device 30 develops a latent image formed on a photosensitive body by using laser beams and the like, by using a toner supplied from a developing device and transfers a toner image obtained by performing developing to a paper.

The printing device 30 monitors a state of components for an image forming process or controls the components for the image forming process based on a result of monitoring or information on print image data to be printed, in order to perform appropriate printing on a paper. An example of one component of the image forming process that is to be controlled is a toner replenishing state. In toner replenishing control as an example of control of the image forming process, replenishing of a toner from a toner cartridge to the developing device is controlled such that an amount of the toner in the developing device becomes appropriate. Toner replenishing to the developing device is controlled collectively based on various sensors or a result of an analysis process. However, in this exemplary embodiment, a description will be made focusing on toner replenishing control (also referred to as dispensing control) based on image density (or figures equivalent to the image density, such as the number of pixels and image concentration. Hereinafter, collectively referred to as the image density) of an image to be printed. There is temperature control of a fixing machine as another example of control of the image forming process. The temperature control of a fixing machine means a process of controlling temperature of the fixing machine in accordance with an amount of a toner applied to a paper in order to perform appropriate fixing. Since the amount of a toner corresponds to image density of a page to be printed, information on the image density is also used in the temperature control of the fixing machine. There are correction of unevenness in a surface, registration of an image, and the like as still another example of control of the image forming process. Image density at each area in a page which will be described later (an individual area obtained as a result of dividing a page) may be used in these examples. For example, when correction of unevenness in a surface is performed, if image density at each area is acquired, correction parameters may be adjusted appropriately for each area in accordance with the acquired image density.

The image density refers to a proportion of an area occupied by a portion on which a toner is placed out of the entire area of a surface of a paper. In a case of the electrophotographic process, a half tone process is performed on an image to be printed and thus a pixel having multilevel density is divided into plural sub-pixels having bi-level density and density of the pixel is expressed by the number of pixels that corresponds to ON (that is, the toner is placed) among the plural sub-pixels. Accordingly, image density of a page is substantially equal to an average of density of pixels in the page. The number of pixels to be calculated in an ICDC type described in the column of "Related Art" refers to the number of sub-pixels that corresponds to ON in one page. Thus, the number of pixels to be calculated refers to a figure equivalent to the image density if it is considered that an area of a page is known.

The rasterizing device 20 calculates image density of an image to be printed to supply the calculated image density to the printing device 30 in order to perform toner replenishing control based on the image density (details will be described later).

In a configuration illustrated in FIG. 1, the intermediate data generation device 10 and the rasterizing device 20 are configured as at least logically individual devices. The intermediate data generation device 10 and the rasterizing device 20 may be respectively installed on physically individual computer devices or may be installed as individual programs on the same computer device. A flexible system may be constructed by logically separating the intermediate data generation device 10 and the rasterizing device 20 and in the flexible system, for example, the plural intermediate data generation devices 10 are provided and operated in parallel to supply output from the plural intermediate data generation device 10 to one rasterizing device 20 when a load of generating intermediate data is large. When the intermediate data generation device 10 and the rasterizing device 20 are configured as physically individual devices, both of the devices 10 and 20 are connected to each other through, for example, a data communication network such as a local area network. The rasterizing device 20 and the printing device 30 may be connected to each other through a dedicated communication cable or may be connected to each other through a data communication network.

First Exemplary Embodiment

Figure 2:
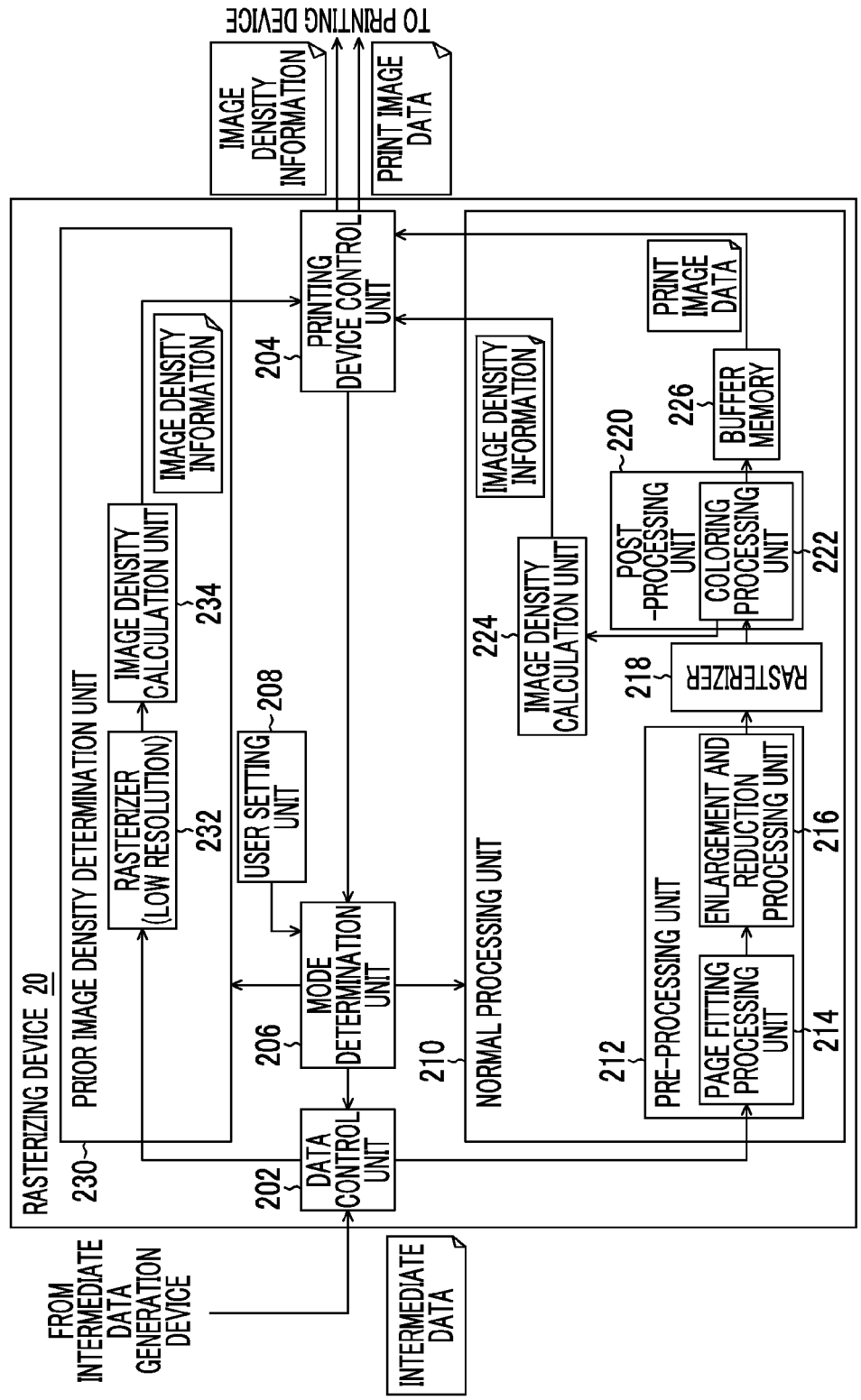
FIG. 2 is a diagram illustrating an example of a configuration of a rasterizing device.

FIG. 2 illustrates an example of an internal configuration of the rasterizing device 20 according to this exemplary embodiment. As illustrated in FIG. 2, the rasterizing device 20 includes a data control unit 202, a printing device control unit 204, a mode determination unit 206, a user setting unit 208, a normal processing unit 210, and a prior image density determination unit 230.

The data control unit 202 receives intermediate data of a page from the intermediate data generation device 10 and provides the received intermediate data for the normal processing unit 210 or for both of the normal processing unit 210 and the prior image density determination unit 230. It is controlled in accordance with a determination result of the mode determination unit 206 whether the intermediate data is provided for only the normal processing unit 210 or whether the intermediate data is provided for both of the normal processing unit 210 and the prior image density determination unit 230.

The printing device control unit 204 is a unit for an interface with the printing device 30 and transfers print image data in the raster format generated or image density information by the rasterizing device 20 to the printing device 30. The printing device control unit 204 may acquire performance information of the printing device 30 (for example, a printing speed of the printing device) from the printing device 30.

The mode determination unit 206 determines whether image density that is a figure value for image forming process control such as the toner replenishing control is calculated by an image density calculation unit 224 in the normal processing unit 210 as in the related art or whether the image density is calculated by the prior image density determination unit 230 newly provided in this exemplary embodiment. This determination will be described later in detail.

The user setting unit 208 is a section configured to receive setting of a user for the rasterizing device 20. Particularly, in this exemplary embodiment, the user setting unit 208 receives setting of a user regarding determination of the mode determination unit 206. For example, the user setting unit 208 provides a user with a UI (user interface) screen on which choices for the determination are displayed and causes the user to perform selection. The displayed choices are as follows, for example: (1) use prior image density determination, (2) do not use prior image density determination (calculate image density through a process in the related art), and (3) automatically determine whether or not prior image density determination is to be used. The UI screen may be displayed on a display device attached to the rasterizing device 20 or may be displayed on a display device of a client computer through a network.

The normal processing unit 210 is a unit configured to perform the same normal rasterizing process as in the related art, on the input intermediate data. That is, the normal processing unit 210 has a function that generates print image data provided for the printing device 30 from the intermediate data and is the same function as that of a device in the related art.

In detail, the normal processing unit 210 includes a pre-processing unit 212, a rasterizer 218, a post-processing unit 220, and the image density calculation unit 224.

The pre-processing unit 212 performs a pre-process for rasterizing intermediate data. The pre-process refers to one of an additional process to be performed on the intermediate data for printing. In the illustrated example, a page fitting process and an enlargement and reduction process are illustrated as an example of the pre-process.

A page fitting processing unit 214 allocates a logical page represented by intermediate data to a surface of a paper which is a physical page. For example, when so-called n-up printing in which n logical pages (n is an integer of equal to or more than two) are arranged and printed on one physical page is performed, n logical pages are fit on one physical page. When duplex printing is performed, each logical page is allocated to any one of the front and the back of the paper. When a printing result is bookbinded, logical pages of a logical page group are arranged in order considering bookbinding and the like and allocated to locations of the front and the back of the paper (called as folding in the field of bookbinding) in accordance with the arranged order. The page fitting processing unit 214 fits a logical page on a physical page in accordance with a page fitting condition designated by a user.

An enlargement and reduction processing unit 216 enlarges or reduces a logical page in the intermediate data format. That is, the enlargement and reduction processing unit 216 enlarges or reduces an image of a logical page represented in the intermediate data format such that the image of the logical page has a magnification or a size designated by a user or such that the image of the logical page is fit to the size of the paper or a pattern for page fitting.

In the first exemplary embodiment, the page fitting process and the enlargement and reduction process are performed at a stage of the intermediate data. For example, the page fitting process or the enlargement and reduction process may be performed on the intermediate data as it is, in a case of the display list format. There is intermediate data in the other intermediate data format on which the page fitting process or the enlargement and reduction process may also be performed. In the example of FIG. 2, page fitting or enlargement and reduction is performed at the stage of the intermediate data, but one or both of the page fitting and the enlargement and reduction may be performed on a raster image of a page obtained after rasterizing as a post-process.

In FIG. 2, the page fitting and the enlargement and reduction are illustrated as pre-processes of rasterizing, but other pre-processes except for these may be performed. For example, a "clipping" process in which a portion of a logical page is cut off as a printing target range may be performed as a pre-process. An example of the clipping process is that a half (range of A4 size) of an A3 size logical page is clipped and printed or that a certain logical page is enlarged and a portion of an enlarging result is clipped.

The page fitting condition, a parameter (magnification and the like) of the enlargement and reduction, and a parameter (what range of a logical page is cut off, and the like) of the clipping process are input by a user (an operator managing the printing system, and the like) through a user interface of the rasterizing device 20 or a user interface of the printing system including the rasterizing device 20.

The rasterizer 218 rasterizes intermediate data to generate raster image data. In the illustrated example, the rasterizer 218 rasterizes the intermediate data obtained by executing the pre-process in the pre-processing unit 212 to generate the raster image data of a physical page (for example, "folding" in a case of bookbinding).

The post-processing unit 220 performs a post-process on the raster image data generated by the rasterizer 218. The post-process refers to one of the additional processes to be performed on the raster image data for printing. Print image data to be supplied to the printing device 30 is generated by rasterizing the intermediate data subjected to the pre-process and performing the post-process on the raster image data as a result of the rasterizing. In the illustrated example, a coloring process is illustrated as an example of the post-process. The coloring process refers to a process of adjusting a value of each pixel in the print image data to match the adjusted value with color reproduction characteristics of the printing device 30. There is color space conversion of converting a color value represented in, for example, a color space and color characteristics (generally, color space and color characteristics in a creation environment of PDL data) of the PDL data into a color value in accordance with a color space and color characteristics of the printing device 30 by using a fixed lookup table and the like, as an example of the coloring process performed in the coloring processing unit 222. In the coloring process, aging of color reproduction characteristics of the printing device 30 detected by forming and reading a test color patch may be corrected by using a tone reproduction curve and the like.

Here, for simple description, a color space for expressing colors of intermediate data is set to use primary colors (for example, CMYK) the same as the color space of the printing device 30. When the primary colors used in the intermediate data are different from primary colors of the printing device 30, a color expression of the intermediate data is converted into an expression when the primary colors of the printing device 30 are used (for example, RGB colors are converted into CMYK colors) at a stage prior to or subsequent to a rasterizer 232.

In the first exemplary embodiment, the color space conversion is executed as the post-process of the rasterizing, but execution of color conversion at the stage of the intermediate data is also considered. Processes except for the color space conversion may be performed on the print image data as the post-process.

The image density calculation unit 224 calculates image density of a physical page from print image data of the physical page, which is subjected to the rasterizing and color space conversion. The image density is obtained for each color (for example, cyan (C), magenta (M), yellow (Y), and black (K)) of toners used in the printing device 30. The image density calculation unit 224 sums up value of a color in the respective pixels of the print image data in the physical page, for example, for each color and divides the summation value by an area (or total number of pixels in the page) of the physical page. Thus, the image density is obtained. The image density may be obtained by performing a half tone process on the print image data subjected to the color space conversion, summing up the number of sub-pixels which are included in the image data subjected to the half tone process and corresponds to the respective colors, for each color, and by dividing the summation value of each color using the area of a page. The printing device 30 is notified of information on image density obtained for each physical page and obtained for each color, from the printing device control unit 204. The information of which the printing device 30 is notified is used for control of image forming for the corresponding color of the corresponding physical page in the printing device 30.

In this exemplary embodiment, the normal processing unit 210 may include a buffer memory 226 for temporarily holding the print image data subjected to the rasterizing and the color space conversion. The buffer memory 226 is configured by using a memory capable of performing reading and writing at a high speed (at a speed higher than a secondary storage device such as a hard disk) such as a semiconductor-based random access memory. The print image data of a physical page is written in the buffer memory 226 in a first-in and first-out manner. That is, the print image data generated by the rasterizer 218 and the like is written in the buffer memory 226 in order of being generated as long as the buffer memory 226 has space. When the printing device 30 is capable of receiving a new physical page, print image data of the forefront physical page (that is, the oldest in order of being written) is extracted from the buffer memory 226 and supplied to the printing device 30. If the buffer memory 226 is full with the written print image data, generation of print image data by the rasterizer 218 and the like is temporarily paused until the buffer memory 226 has space. When a generation speed at which devices (intermediate data generation device 10, rasterizer 218, and the like) at a prior stage of the buffer memory 226 generate print image data of a physical page exceeds a printing speed of the printing device 30, the above-described situation may occur. When the generation speed of print image data is equal to or less than the printing speed, the buffer memory 226 may not be needed and the print image data generated in this case is supplied to the printing device 30 immediately.

The buffer memory 226 is a memory allowable for performing reading and writing at a high speed such as the above-described semiconductor random access memory. A portion of a main memory in the rasterizing device 20 may be used as the buffer memory 226. The rasterizing device 20 may include the buffer memory 226 which is dedicated for holding print image data and is separated from the main memory. When, for cost reduction, the main memory has a low capacity or a memory having a low capacity is used as a dedicated buffer memory 226, not so much print image data of physical pages as print image data storable in the above-described buffer memory 226 may be stored therein.

In the first exemplary embodiment, an image density calculation mode is switched in accordance with the reservable capacity of the buffer memory 226 in the rasterizing device 20. Schematically speaking, when the reservable capacity of the buffer memory 226 is sufficiently large, image density is calculated from the print image data by the image density calculation unit 224 of the normal processing unit 210 through a process in the related art. When the reservable capacity of the buffer memory 226 is not sufficiently large, image density is simply calculated by the prior image density determination unit 230 without using the print image data. The capacity of the buffer memory 226 being "sufficiently large" means that the capacity of the buffer memory 226 is larger than the summation of data amounts of print image data corresponding to "the number of preceding pages". "The number of preceding pages" means the number of pages indicating how many pages prior to the print image data of the physical page in the printing device 30 it is necessary for image density of the pages to be supplied to the printing device 30 in advance in order to establish control of the image forming process on a certain physical page. For example, when the toner replenishing control on the developing device is performed, image density of a physical page before the number of preceding pages prior to a physical page in the process of being printed is supplied to the printing device 30 and thus the printing device 30 may perform control in such a manner that the amount of the toner in the developing device at a point in time of printing a certain physical page is an amount which is enough for when image forming of the physical page is performed in a state where variation tendency in image density from a physical page before the point in time to the subsequent physical page group through the physical page is considered. When the printing device 30 is a high speed machine, the capacity of the buffer memory 226 for determining that the buffer memory 226 is "sufficiently large" is very large (for example, tens of gigabytes in a case of the capacity allowable for holding print image data of 100 pages), as described above.

A value of the number of preceding pages depends on performance of the printing device 30 which is an output destination of a printing job. The rasterizing device 20 or a printing control system including the rasterizing device 20 may acquire information on performance of the printing device 30 which is an output destination and determine the number of preceding pages based on the information. The printing control system may be notified of the number of preceding pages from the printing device 30.

The normal processing unit 210 may be configured as software. That is, the rasterizing device 20 adopts so-called a software raster image processing (RIP) process.

The prior image density determination unit 230 calculates image density of a page instead of the image density calculation unit 224 of the normal processing unit 210 when the "sufficiently large" buffer memory 226 cannot be reserved in the rasterizing device 20, in an example of one prior image density determination unit 230. The prior image density determination unit 230 includes the rasterizer 232 and an image density calculation unit 234.

The rasterizer 232 is the same as the rasterizer 218 of the normal processing unit 210 and executes the rasterizing process of the intermediate data. The rasterizer 232 generates a raster image having a predetermined resolution which is lower than that of high resolution print image data supplied to the printing device 30. Since the prior image density determination unit 230 does not include the pre-processing unit 212, the rasterizer 232 rasterizes intermediate data of a logical page without performing the pre-process.

The image density calculation unit 234 calculates image density from image data in the raster format output from the rasterizer 232. A calculating process of image density may be similar to a calculating process in the image density calculation unit 224 of the normal processing unit 210. Raster image data to be generated by the rasterizer 232 is different from a raster image which is received from the rasterizer 218 and is subjected to the enlargement and reduction and the like by the pre-processing unit 212 in view of the number of pixels (resolution) in each one logical page. Accordingly, image density calculated by the image density calculation unit 234 does not completely match with image density calculated by the image density calculation unit 224 of the normal processing unit 210. However, the image density calculated by the image density calculation unit 234 may be used as a sufficiently approximate value for control. When highly accurate control is required in an image control process, if an instruction of the enlargement and reduction and the like is received, the prior image density determination unit 230 may be controlled not to be used (detailed example will be described later).

Since raster image data for each logical page is output from the rasterizer 232, a simply calculated image density is the same as the obtained image density of a logical page and has a different meaning from image density for each physical page calculated by the image density calculation unit 224 of the normal processing unit 210. Accordingly, the image density calculation unit 234 may calculate image density of the physical page from the values of the respective pixels in the raster image data of plural logical pages fit on the same physical page in accordance with the page fitting condition input by a user (condition the same as that used in the page fitting processing unit 214). For example, when the n-up printing is performed, the image density calculation unit 234 may calculate image density for every n page in order from the forefront logical page. In this case, pixel values of the respective pixels in n logical pages are summed up for each color, the summation value for each color is divided by the total area of the n pages (or the total number of pixels), and thus image density of one physical page may be obtained.

When page fitting for bookbinding is performed in the normal processing unit 210, the image density calculation unit 234 of the prior image density determination unit 230 may specify a logical page group fit on the same physical page based on the page fitting condition and calculate an average of image density of pages in the logical page group. In this case, the average is output as image density information of the physical page.

When the clipping process is performed in the pre-processing unit 212, an image cut out from a logical page by performing clipping generally has pixel distribution largely different from that of an original logical page. Accordingly, when the clipping process is performed, image density of a logical page obtained by the prior image density determination unit 230 is different from image density of a print image (physical page) obtained from the clipped portion. For this reason, when highly accurate control is required, if clipping is designated, the prior image density determination unit 230 may be controlled not to be used (detailed example will be described later).

The rasterizer 232 and the image density calculation unit 234 constituting the prior image density determination unit 230 may be installed by software.

The prior image density determination unit 230 rasterizes intermediate data, but does not perform processes of the pre-processing unit 212 and the post-processing unit 220. Accordingly, the prior image density determination unit 230 has a processing speed per page faster than that of the normal processing unit 210 by a time for which the pre-process and the post-process are not performed. The thumbnail image generated by the rasterizer 232 has a resolution much lower than print image data to be printed, that is, a smaller number of pixels. Thus, the number of counting pixel values for obtaining image density may be small. This point also results in an effect of increasing a calculation speed of image density. This advantage of the low resolution and an effect of omission of the above-described pre-process and post-process are combined and thereby image density calculation in the image density calculation unit 234 may be processed at a speed higher than that in the image density calculation unit 224 which calculates image density from print image data. This difference in the processing speed causes the prior image density determination unit 230 to process a page earlier than the normal processing unit 210. As the process proceeds, a difference in progress of processing a page between the prior image density determination unit 230 and the normal processing unit 210 becomes large. If the difference in pages reaches the number of preceding pages which is described above, it is no longer necessary that the prior image density determination unit 230 processes a page in advance. Accordingly, after a point in time at which the difference in pages reaches the number of preceding pages, the prior image density determination unit 230 may transition to a normal state in which image density of one physical page is calculated each time the printing device 30 prints one page (this pace is equal to a pace for which the normal processing unit 210 generates print image data of one physical page in a principle). The prior image density determination unit 230 may acquire timing information of starting or ending printing for each physical page from the printing device control unit 204 and the like in order to match paces with each other in the normal state.

The number of pages by which the prior image density determination unit 230 precedes the normal processing unit 210 during a time period from starting printing to reaching the above-described normal state is smaller than the number of preceding pages which is described above and is for enabling appropriate control of the image forming process based on the image density. Accordingly, control of the image forming process such as the toner replenishing control may be performed with slightly low accuracy during the time period. To avoid this situation, for example, print image data may be caused to wait to be output from the normal processing unit 210 to the printing device 30 until the prior image density determination unit 230 completes calculating image density of pages corresponding to the number of preceding pages.

In this case, the prior image density determination unit 230 calculates image density of each physical page in order from the forefront in a printing job and transmits information of the calculated image density to the printing device 30. On the other hand, the normal processing unit 210 generates print image data of each physical page in order from the forefront in the printing job, but the generated print image data is not transmitted to the printing device 30 and is stored in the buffer memory 226. The print image data stored in the buffer memory 226 is caused to start to be output to the printing device at a point in time at which the prior image density determination unit 230 transmits image density of physical pages corresponding to the number of preceding pages to the printing device 30. With this, it is possible to appropriately control the image forming process considering image density of a physical page group of pages from the forefront physical page in a printing job to a page before the number of preceding pages.

In the first exemplary embodiment, it is necessary that the buffer memory 226 has a capacity to the extent that print image data generated by the normal processing unit 210 may be stored during the time that the prior image density determination unit 230 requires image density of physical pages corresponding to the number of preceding pages from the forefront page in a printing job. However, the capacity may be smaller than an amount of print image data of physical pages corresponding to the number of preceding pages. This is because the prior image density determination unit 230 has a processing time per one physical page shorter than that of the normal processing unit 210 by at least a time for which the pre-process or the post-process is not performed and the number of pages of print image data generated in the normal processing unit 210 is small. The buffer memory 226 may have a capacity to the extent that the print image data generated by the normal processing unit 210 may be stored during the time that the prior image density determination unit 230 calculates image density of pages corresponding to the number of preceding pages. For example, when the buffer memory 226 does not have a capacity of such an extent, the print image data (that is, a processing result of the post-processing unit 220) generated by the normal processing unit 210 may be spooled in a secondary storage device such as a hard disk and a solid state disk (SSD). The print image data of the respective pages stored in the secondary storage device is sequentially supplied to the printing device 30 page by page in accordance with, for example, a request for the next page from the printing device 30. In such a configuration in which the print image data is spooled in the secondary storage device, print image data is caused to wait to be supplied to the printing device 30, for example, until the prior image density determination unit 230 completes calculating image density of pages corresponding to the number of preceding pages, from the forefront page in a job (in other words, until generation of print image data of pages corresponding to the number of preceding pages, from the forefront page in the job is ended). The print image data is caused to start to be output to the printing device 30 from the secondary storage device at a point in time at which the calculation of the image density of pages corresponding to the number of preceding pages completes.

The print image data may be data-compressed before being stored in the buffer memory 226 or the secondary storage device. In this case, the compressed data read from the buffer memory 226 or the like is decompressed to be supplied to the printing device 30.

The prior image density determination unit 230 rasterizes intermediate data for calculating image density in each logical page. Thus, in one example, a memory capacity is necessary for holding raster image data of one logical page. However, the memory capacity for one page is much smaller than a capacity (for example, corresponding to 100 pages or more) of the buffer memory 226 necessary for a case where print image data of pages corresponding to the number of preceding pages is stored in the buffer memory 226. Accordingly, image density may be calculated by using the prior image density determination unit 230 even in a computer device unable to reserve a large capacity for the buffer memory 226.

The prior image density determination unit 230 may calculate image density from an image spread out on a memory having a capacity for holding raster image data in a unit of the rasterizing process if the memory has the capacity. Accordingly, a capacity of the memory necessary for the prior image density determination unit 230 may become smaller if intermediate data to be processed has a data structure in which rasterizing may be performed in a unit smaller than a logical page. For example, the prior image density determination unit 230 may reserve a memory area corresponding to a data amount of raster images in one line if the intermediate data may be rasterized in a unit of one line (main scanning line). When intermediate data may be rasterized in a unit of a band (belt-shaped area obtainable by dividing a logical page into equal parts in a sub-scanning line direction) or a tile (rectangular area obtainable by dividing a logical page into equal parts in both of the main scanning line direction and the sub-scanning line direction), a capacity of the memory for one band or one tile may be reserved. The rasterizing being possible in a certain unit means that a raster image is generated by the unit when intermediate data is processed in order from the forefront and intermediate data subsequent to the unit does not have an influence on the raster image in the unit.

An example of processing procedures of the rasterizing device 20 according to the exemplary embodiment will be described with reference to FIG. 3. Prior to the start of these procedures, a user completes selecting one among three choices through the user setting unit 208 and the three choices are as follows: (1) use prior image density determination, (2) do not use prior image density determination, and (3) automatically determine whether or not to use prior image density determination.

In these procedures, the mode determination unit 206 acquires information of user setting which is set through the user setting unit 208 for example, when execution of a printing job is instructed (S10). Determination of which one of (1) and (2) is indicated by the information of user setting is performed (S12 and S16). When the information indicates (1) (determination result in S12 is YES), the mode determination unit 206 sets a prior determination flag indicating whether or not prior determination of image density is performed to be "effective" (perform the prior determination) (S14). When the information indicates (2) (determination result in S16 is YES), the mode determination unit 206 sets the prior determination flag to be "ineffective" (does not perform the prior determination) (S18).

When both of the determination results in S12 and S16 are No, the user setting refers to the above described (3) (automatic determination). In this case, the mode determination unit 206 acquires the size (capacity) of the memory area reservable as the buffer memory 226 in the rasterizing device 20 from an operating system of managing the rasterizing device 20, or the like. It is determined whether or not the size of the memory area is equal to or larger than data capacity (in the example of FIG. 3, the capacity of 100 physical pages) of pages corresponding to the number of preceding pages (S20). When the determination result in S20 is No, that is, when the capacity sufficient for storing pages corresponding to the number of preceding pages cannot be reserved as the buffer memory 226, the mode determination unit 206 sets the prior determination flag to be "effective" (S22). With this, the prior image density determination unit 230 calculates image density. On the contrary, when the determination result in S20 is Yes, the mode determination unit 206 sets the prior determination flag to be "ineffective" (S24). With this, the normal processing unit 210 calculates image density.

When determination in S20 is performed, the mode determination unit 206 may acquire information on the printing speed of the printing device 30 from the printing device 30 (or other device that holds performance information of the printing device 30) and may calculate the number of preceding pages used as a determination threshold in S20 in accordance with the acquired printing speed. Generally, as the printing speed becomes fast, a large determination threshold in S20 is necessary.

After S14, S18, S22, or S24, the mode determination unit 206 determines whether or not the prior determination flag is set to be "effective" (S26). When the determination result is Yes, the mode determination unit 206 causes the prior image density determination unit 230 to be effective (S28). In S28, a function of the prior image density determination unit 230 is operated by executing a program describing the function of the prior image density determination unit 230, for example. At this time, the mode determination unit 206 causes the image density calculation unit 224 of the normal processing unit 210 to be ineffective (or not to be operated) and thus a processing load in a CPU of the rasterizing device 20 may be reduced. Alternatively, control in which the image density calculation unit 224 of the normal processing unit 210 is operated, but the printing device 30 is not notified of the image density obtained by the image density calculation unit 224 may be performed. The mode determination unit 206 instructs the data control unit 202 to supply the intermediate data to both of the prior image density determination unit 230 and the normal processing unit 210. With this instruction, the intermediate data is respectively supplied to the prior image density determination unit 230 and the normal processing unit 210 from the data control unit 202. Accordingly, the prior image density determination unit 230 calculates image density and the printing device 30 is notified of the calculated image density (S30). At the same time, the normal processing unit 210 rasterizes the intermediate data (also including the pre-process and the post-process) to generate print image data (S32). In this case, the generated print image data may be immediately output to the printing device 30. Additionally, the generated print image data may be temporarily stored in the reserved buffer memory 226 and be output in the first-in and first-out manner each time a request for the next page is received from the printing device 30, for example.

When the determination result in S26 is No, the normal processing unit 210 reserves the buffer memory 226 having a capacity corresponding to the determination threshold (the number of preceding pages) in S20 and starts processing. The mode determination unit 206 may instruct the data control unit 202 to supply the intermediate data to the normal processing unit 210 and not to supply the intermediate data to the prior image density determination unit 230. At this time, the image density calculation unit 224 of the normal processing unit 210 may be caused to be effective (causing to be effective is not required in a structure in which the image density calculation unit 224 also operates while the normal processing unit 210 operates). Accordingly, the normal processing unit 210 executes the pre-process, the rasterizing, and the post-process on the intermediate data supplied from the data control unit 202 to generate print image data of each physical page (S32). The generated print image data is stored in the buffer memory 226.

The normal processing unit 210 determines whether or not the prior determination flag is set to be "ineffective" (S34). If the prior determination flag is "ineffective", the normal processing unit 210 notifies the printing device 30 of the image density information obtained by the image density calculation unit 224 of the normal processing unit 210 (S36). The printing device 30 is notified of image density information of the next page obtained by the image density calculation unit 224 each time it is a time that the printing device 30 requires image density of the next page. Print image data of a certain page completed by processing of the post-processing unit 220 is transmitted to the printing device 30 at a time matching with a timing at which the printing device 30 prints the page (S38). The print image data of the physical page is read from the buffer memory 226 to be sent to the printing device 30 at a timing at which a time required for printing physical pages corresponding to the number of preceding pages elapses from a point in time at which the printing device 30 is notified of image density of a certain physical page in the normal state which is after a time of some extent elapses from starting the printing job. When the determination result in S34 is No, the prior image density determination unit 230 provides the printing device 30 with the image density. Accordingly, S36 is skipped and the print image data is sent to the printing device 30 in order of pages (S38).

In the process described using FIGS. 2 and 3, with which one of the image density calculation unit 224 of the normal processing unit 210 and the prior image density determination unit 230 the image density is obtained is dynamically determined in accordance with a capacity of a memory held in a computer in which the rasterizing device 20 is mounted. Accordingly, software for realizing the process may be executed in various computers having different memory capacities.

As described above, the systematic configuration and the processing details in the exemplary embodiment according to the invention are exemplified. However, the above-described exemplary embodiment is only an example and various modifications within a scope of the invention may be made.

Second Exemplary Embodiment

Figure 4:
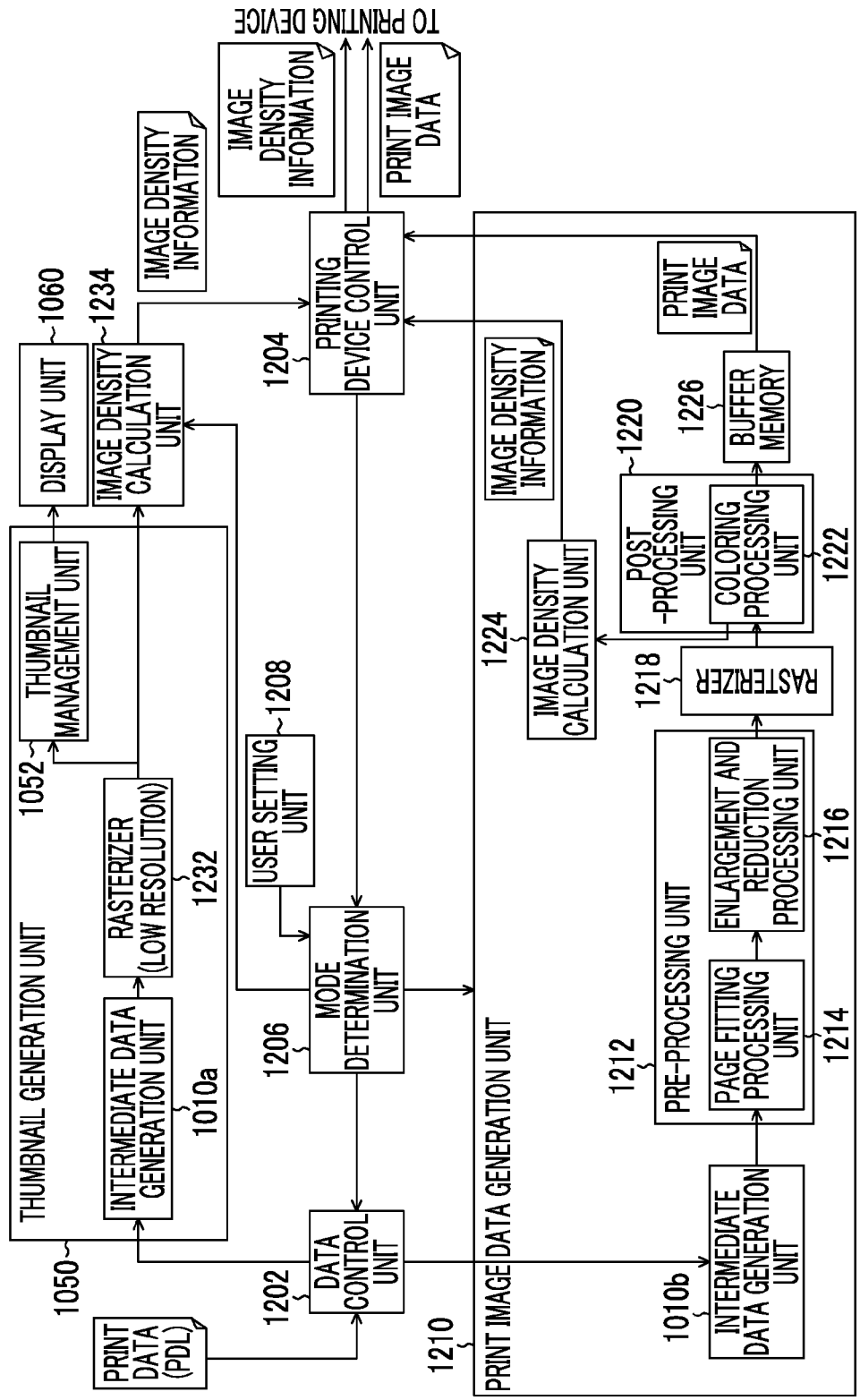
FIG. 4 is a diagram illustrating a systematic configuration example according to a modification example of the exemplary embodiment.

For example, in an example illustrated in FIG. 4, image density information is calculated based on a thumbnail image for display generated by the thumbnail generation unit 1050, instead of using the prior image density determination unit 230. In the above-described exemplary embodiment, the configuration for generating print image data from PDL data is divided into the intermediate data generation device 10 and the rasterizing device 20. However, in the example of FIG. 4, the configuration is implemented in one device. In FIG. 4, components having the same functions as those of the components included in the configuration illustrated in FIG. 2 are denoted by reference numerals obtained by adding "1000" to the reference numerals of the components in FIG. 2.

A printing control system illustrated in FIG. 4 includes a thumbnail generation unit 1050, a display unit 1060, a data control unit 1202, a printing device control unit 1204, a mode determination unit 1206, a user setting unit 1208, a print image data generation unit 1210, and an image density calculation unit 1234.

The data control unit 1202 receives print data input to this printing system from the outside of this printing system and supplies the received print data to the thumbnail generation unit 1050 and the print image data generation unit 1210.

The thumbnail generation unit 1050 generates a low resolution image for display (thumbnail) of a page to be printed from the print data described in the PDL. The thumbnail of each page generated by the thumbnail generation unit 1050 is displayed on the display unit 1060 (for example, liquid crystal display) handling a user interface of the printing control system, for example. Display of the thumbnail is used, for example, for an operator of the printing control system confirming image contents of the print data. It is considered that a simple job editing such as changing of a print page order is performed by an operation of changing an order of thumbnails displayed on a graphical user interface (GUI) and the like.

The thumbnail generation unit 1050 includes an intermediate data generation unit 1010*a*, a rasterizer 1232, and a thumbnail management unit 1052. The intermediate data generation unit 1010*a* converts the print data received from the data control unit 1202 into intermediate data. The rasterizer 1232 rasterizes the intermediate data generated by the intermediate data generation unit 1010*a*. In the rasterizing process, a raster image (hereinafter, referred to as "thumbnail image") is generated and the raster image has a resolution which is lower than that of high resolution image data for printing (print image data) and is a predetermined thumbnail resolution. The thumbnail resolution refers to a resolution when an image represented by the print data is displayed on the display unit 1060 as the thumbnail. The thumbnail resolution is lower than the resolution of the print image data. The generated thumbnail image is stored in the thumbnail management unit 1052 and the thumbnail management unit 1052 manages the stored thumbnail image. The thumbnail management unit 1052 displays the stored thumbnail image of each page on the display unit 1060 in accordance with an instruction input from a user through the GUI and the like which is displayed on the display unit 1060. Another application example is also considered in which the thumbnail image of each page is displayed on the GUI and an instruction of changing a printing order of pages is received from the user over the GUI. It is also considered that the generated thumbnail image of each page is supplied to the printing device 30 at the subsequent stage and the thumbnail image is displayed on a screen provided in the printing device 30 (for example, the printing device 30 displays the thumbnail image of the page in the process of being currently printed).

The image density calculation unit 1234 is a function module corresponding to the image density calculation unit 234 of the prior image density determination unit 230 in the example of FIG. 2.

In the second exemplary embodiment, the intermediate data generated by the intermediate data generation unit 1010*a* is input to the rasterizer 1232 without being subjected to the pre-process such as the page fitting. The thumbnail image generated by the rasterizer 1232 is input to the thumbnail management unit 1052 and the image density calculation unit 1234 without being subjected to the post-process such as the color conversion. Accordingly, since the image density calculation unit 1234 calculates image density from the thumbnail image without being subjected to the pre-process and the post-process, similarly to a case of the example in FIG. 2, a time necessary for calculating image density may be shorter than that in an image density calculation unit 1224 to be described later which calculates image density from print image data subjected to the pre-process and the post-process. The thumbnail image generated by the rasterizer 1232 has a resolution lower than that of print image data to be printed, that is, the number of pixels is small and thus the number of counting pixel values for obtaining image density may be small. This point results in an effect of reduction in calculation time of image density. This advantage of the low resolution and an effect of omission of the above-described pre-process and post-process are combined and thereby image density calculation in the image density calculation unit 1234 may be processed at a speed higher than that in the image density calculation unit 1224 which calculates image density from print image data.

The image density generated by the image density calculation unit 1234 is supplied to the printing device 30 through the printing device control unit 1204.

The print image data generation unit 1210 is a module for generating print image data which is high resolution image data for printing and corresponds to the normal processing unit 210 in the example of FIG. 2. However, the print image data generation unit 1210 is different from the normal processing unit 210 in that the print image data generation unit 1210 includes an intermediate data generation unit 1010b.

The intermediate data generation unit 1010b converts the print data input from the data control unit 1202 into intermediate data and inputs the converted intermediate data to a pre-processing unit 1212. Hereinafter, the pre-processing unit 1212 (page fitting processing unit 1214 and enlargement and reduction processing unit 1216), a rasterizer 1218, a post-processing unit 1220 (coloring processing unit 1222), the image density calculation unit 1224 and a buffer memory 1226 perform the same process as that of the respectively corresponding components in FIG. 2. Accordingly, the rasterizer 1218 generates high resolution print image data for printing from the intermediate data subjected to the pre-process. The post-processing unit 1220 performs the post-process on the high resolution print image data. The image density calculation unit 1224 calculates image density from the high resolution print image data subjected to the pre-process and the post-process. In this manner, a time necessary for calculating image density in the image density calculation unit 1224 is longer than a time in a case of the above-described image density calculation unit 1234.

The mode determination unit 1206 determines which one of the image density calculation units 1224 and 1234 image density obtained by the one is supplied to the printing device 30 based on setting information of a user input from the user setting unit 1208, similarly to the mode determination unit 206 in FIG. 2.

As described above, in the system according to the second exemplary embodiment (see FIG. 4), the rasterizer 1232 that executes the rasterizing process for a low resolution performs generation of a thumbnail image for screen display and prior calculation of image density.

Meanwhile, when a data format which does not depend on a resolution is used as the intermediate data format, in the configuration of FIG. 4, the intermediate data generation unit 1010a for a thumbnail and the intermediate data generation unit 1010b for print image data may be merged into one. In this case, intermediate data generated from print data by a common intermediate data generation unit is supplied to the rasterizer 1232 of the thumbnail generation unit 1050 and the pre-processing unit 1212 of the print image data generation unit 1210. Since the thumbnail generation unit 1050 generally has a process speed higher than that of the print image data generation unit 1210, the thumbnail generation unit 1050 processes a page at an earlier time by a time of that extent. The intermediate data generated by the common intermediate data generation unit may be stored (buffered) in a memory until the print image data generation unit 1210 processes the intermediate data generated by the common intermediate data generation unit. Since the intermediate data has a data amount much less than that of the raster image data, a capacity of a memory for holding the intermediate data may be much less than that of the buffer memory 1226 for print image data.

In the above-described example, the rasterizer 1232 of the thumbnail generation unit 1050 generates a raster image having a fixed thumbnail resolution. A page may also include a bitmap image as an image object, but the rasterizer 1232 may perform the rasterizing on the page including such a bitmap image with a resolution of the bitmap image, not a thumbnail resolution. The reason of this is that since a load in a resolution converting process of converting a resolution of the bitmap image in the page into the thumbnail resolution is quite high, the resolution of the entirety of the page matching with the resolution of the bitmap image causes a processing load in the entirety of the page to be small.

First Modification Example

A first modification example of the above-described exemplary embodiment will be described with reference to FIG. 5. Components among components illustrated in FIG. 5, which are the same as the components illustrated in FIG. 2 are denoted by the same reference numerals and the repetitive description will be omitted.

Figure 5:
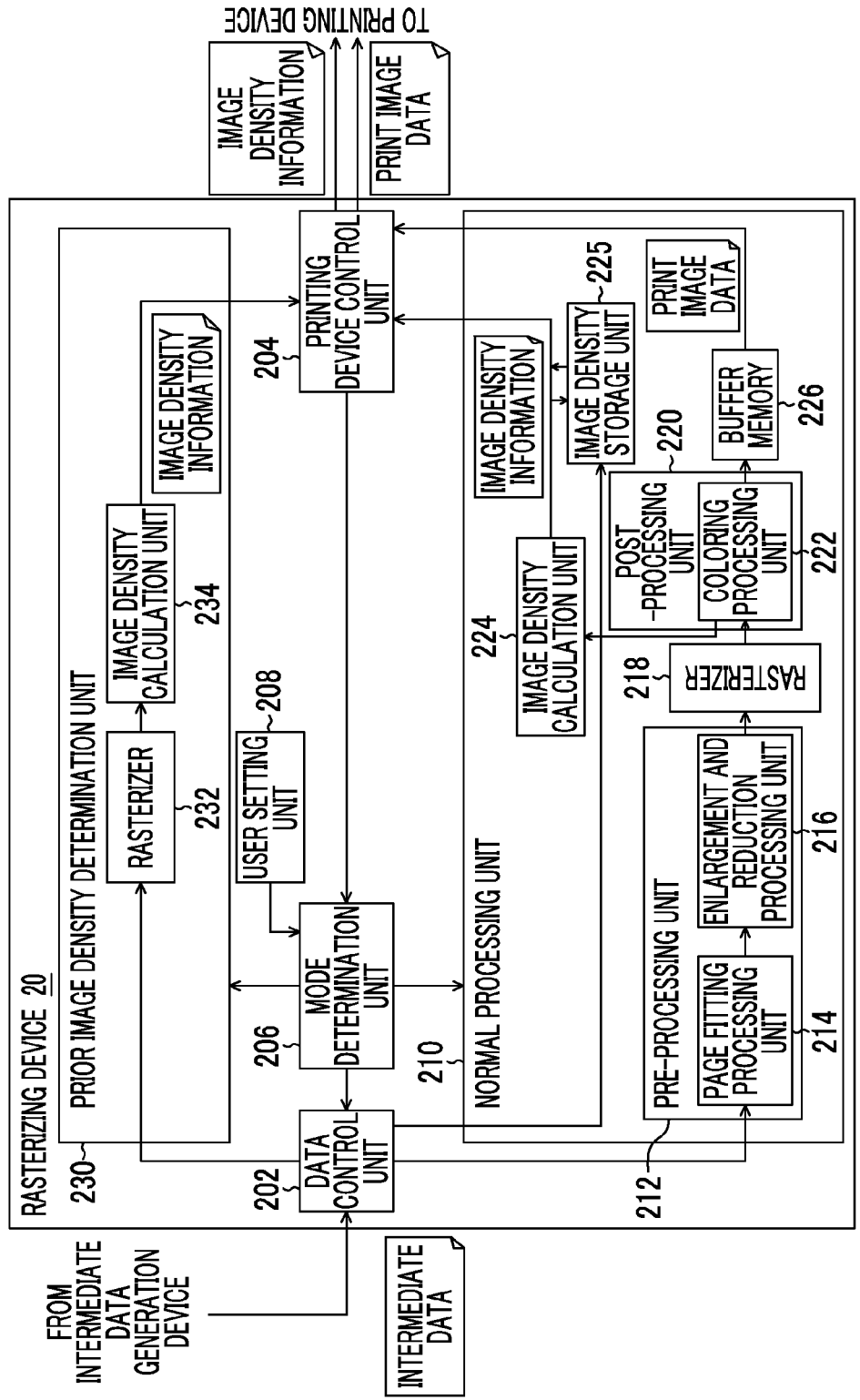
FIG. 5 is a diagram illustrating a systematic configuration of a first modification example.

In the first modification example illustrated in FIG. 5, in a case where print data is printed to be plural copies, image density information obtained by the prior image density determination unit 230 is provided for the printing device 30 when a first copy is formed and image density information obtained by the normal processing unit 210 is provided for the printing device 30 when a second and subsequent copies are formed. For this reason, the rasterizing device 20 in the modification example of FIG. 5 includes an image density storage unit 225 that stores image density calculated by the image density calculation unit 224 of the normal processing unit 210.

In the first modification example, the image density calculation unit 224 of the normal processing unit 210 also obtains image density from print image data of each physical page output from the post-processing unit 220 and associates the obtained image density with identification information (for example, a page number) of the physical page to store the associated image density in the image density storage unit 225 even when the prior image density determination unit 230 is caused to be effective in printing the first copy of the print data. At this time, the image density obtained by the image density calculation unit 224 is not sent to the printing device 30. This is because the image density of the same page as that obtained by the prior image density determination unit 230 is already transmitted to the printing device 30.

The image density information of each physical page stored in the image density storage unit 225 is obtained from print image data subjected to the pre-process and the post-process and is exact information. On the other hand, the image density obtained by the prior image density determination unit 230 is obtained from a low resolution image which is not subjected to the pre-process and the post-process and includes an allowable error. In other words, the image density which is stored in the image density storage unit 225 and calculated from the print image data is more accurate than the image density obtained by the prior image density determination unit 230.

In the first modification example, the image density obtained by the prior image density determination unit 230 is supplied to the printing device 30 preceding that printing is accelerated, in printing of the first copy. Exact image density information of all physical pages is already stored in the image density storage unit 225 at a point in time at which printing of a second copy is started. Accordingly, the exact image density information is supplied to the printing device

30. An operation of the prior image density determination unit 230 is not required in printing of the second and subsequent copies.

In more detail, the data control unit 202 causes the prior image density determination unit 230 to handle to supply the image density information to the printing device 30 in printing of the first copy and causes the normal processing unit 210 to store the image density information calculated by the image density calculation unit 224 to be stored in the image density storage unit 225. The data control unit 202 acquires a progress situation of printing (for example, an n-th page of an n-th copy is in the process of being printed) in the printing device 30 from the printing device control unit 204 and if the number of the remaining pages in the first copy (for example, a result obtained by subtracting the page number of the page in the process of currently being printed from the number of the total physical pages in a job) reaches the number of preceding pages, the data control unit 202 causes the image density information of the forefront physical page in the job stored in the image density storage unit 225 to be output to the printing device 30. Then, the data control unit 202 supplies image density information of the next physical page to the printing device 30 from the image density storage unit 225 each time the printing device 30 prints one page. Accordingly, the printing device 30 may always apply image density information of a physical page group of the number of preceding pages prior to the page in the process of being printed, to control of the image forming process.

When each of the second and subsequent copies is printed, the data control unit 202 causes the normal processing unit 210 to rasterize (including the pre-process and the post-process) the print data in the job again and thereby the generated print image data may be supplied to the printing device 30. If doing so, it is possible to handle a case where the printing device 30 does not have a memory or a secondary storage device of a capacity sufficient for holding print image data of all of the physical pages in one job.

The print image data generated when the first copy is printed may be stored in the secondary storage device (for example, a hard disk) being in the rasterizing device 20 and when the second and subsequent copies are printed, the print image data stored in the secondary storage device may be read and be supplied to the printing device 30. The print image data stored in the secondary storage device may be data-compressed. In this case, the compressed data read from the secondary storage device may be decompressed in the rasterizing device 20 or in the printing device 30 being a supply destination.

In the above description, the modification example of the rasterizing device 20 (first exemplary embodiment) illustrated in FIG. 2 is described. However, modification similar to the above-described first modification example may also be made for the system (second exemplary embodiment) illustrated in FIG. 4, in which the intermediate data generation function and the rasterizing function are integrally formed.

Second Modification Example

A second modification example will be described with reference to FIG. 6. Components illustrated in FIG. 6, which are the same as the components illustrated in FIG. 2 (first exemplary embodiment) are denoted by the same reference numerals and the repetitive description will be omitted.

Figure 6:
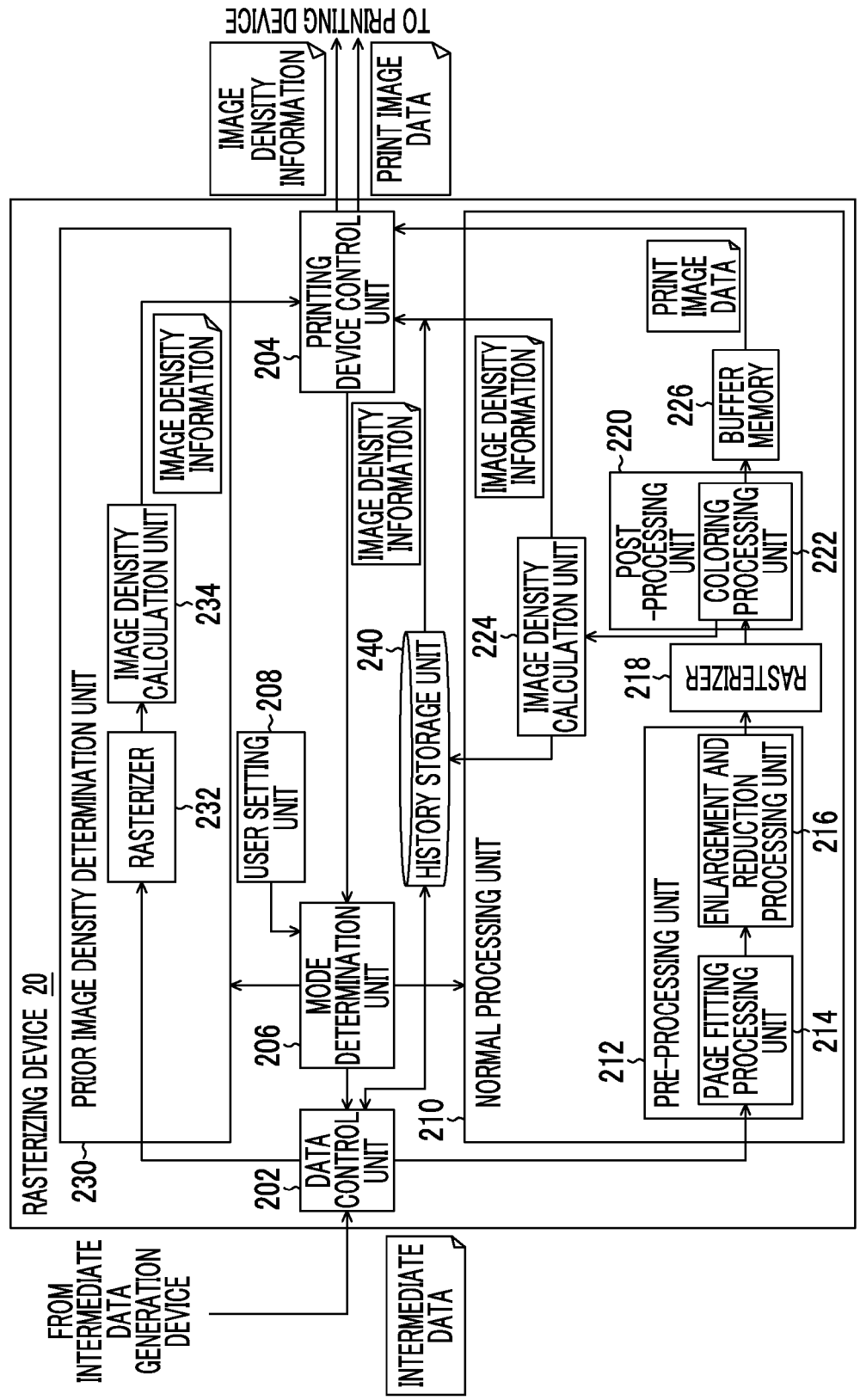
FIG. 6 is a diagram illustrating a systematic configuration of a second modification example.

In the second modification example illustrated in FIG. 6, when a printing job is performed firstly, image density information of each page in the printing job, which is obtained by the image density calculation unit 224 of the normal processing unit 210 is held. When execution of the same printing job is instructed afterward, the held image density information of each page is supplied to the printing device 30 instead of calculating image density in the prior image density determination unit 230 or in the normal processing unit 210.

The rasterizing device 20 according to the second modification example includes a history storage unit 240. The history storage unit 240 is a unit for storing history information regarding the executed job. The stored history information includes items such as an ID (identification information) of the job, an execution date and time, and information (if being present) of an error occurring when the job is executed. However, in this modification example, the history information further includes image density information (obtained by the normal processing unit 210) of each page in the job.

In the second modification example, the data control unit 202 examines whether or not history information corresponding to the ID of the job is in the history storage unit 240 when execution of a printing job is started. When such the history information is not in the history storage unit 240, the data control unit 202 calculates and transmits image density and executes the job by following the same procedures as those (see FIG. 3) of the exemplary embodiment. That is, when the prior image density determination is determined to be effective, the image density obtained by the prior image density determination unit 230 is provided for the printing device 30 and when the prior image density determination is determined to be ineffective, the image density obtained by the normal processing unit 210 is provided for the printing device 30. When the prior image density determination unit 230 is caused to be effective, the data control unit 202 causes the image density calculation unit 224 of the normal processing unit 210 to calculate image density and inserts the image density information of each page obtained as this result into the history information of the job stored in the history storage unit 240.

If the history information corresponding to the ID of a printing job to be executed is in the history storage unit 240, image density information included in the history information is supplied to the printing device 30 when the job is executed. At this time, the image density calculation unit 224 of the normal processing unit 210 and the image density calculation unit 234 of the prior image density determination unit 230 may not be operated.

A flow of processing when image density information is supplied to the printing device 30 from the history storage unit 240 is, for example, as follows. When printing of a printing job is started, first, image density information of pages corresponding to the number of preceding pages, from the forefront page, which are included in history information of the job stored in the history storage unit 240 is transmitted to the printing device 30 in order of pages. After transmitting the image density information of the pages corresponding to the number of preceding pages, print image data is started to be supplied to the printing device 30 from the normal processing unit 210. Image density information of the next page is supplied to the printing device 30 from the history storage unit 240 each time the printing device 30 prints one page.

In such the second modification example, when the same job is printed again, highly accurate image density information obtained from the print image data is supplied to the printing device 30 at a time of executing of the job at first.

The second modification example may also be applied to the systematic configuration of the second exemplary embodiment illustrated in FIG. 4, similarly to the first modification example.

Third Modification Example

In the exemplary embodiments and the modification examples described until now, whether or not the prior image density determination is set to be effective is determined in accordance with an instruction of a user regarding whether or not to use the prior image density determination or the capacity of a memory included in the system. On the contrary, in a third modification example which will be described next, determination is performed based on an individual determination reference.

As one of the determination reference, there is an execution mode of a printing job. Examples of an execution mode of the printing job in the printing system are a mode (referred to as an "on-the-fly" mode) in which rasterized data is immediately printed and a mode in which print image data generated by performing only rasterizing is spooled in a hard disk or the like, not printed (referred to as a "spooling" mode). When a job is executed in the spooling mode, the printing device 30 is not required to quickly be notified of image density information of each physical page (the printing device 30 requires the image density information when the following print instruction is generated). Accordingly, the prior image density determination is set to be ineffective. In this case, generation of print image data of each physical page by rasterizing and the like in the normal processing unit 210 and calculation of image density of the generated print image data by the image density calculation unit 224 are performed together. Furthermore, the generated print image data is spooled and the calculated image density information of each page is stored. When the spooled print image data is printed, the stored image density information of each physical page is provided for the printing device 30.

As another determination reference, there is a print image quality level which is one of print properties designated by a user. For example, when the designated print image quality level is higher than a predetermined reference image quality level, the prior image density determination is set to be ineffective and image density information obtained by the image density calculation unit 224 of the normal processing unit 210 is supplied to the printing device 30.

As a still another determination reference, there is whether or not there is an instruction, from a user, of a print option which is for an image represented by PDL data of a printing job and is followed by change of image contents, such as the enlargement and reduction and the clipping process. The clipping process refers to a process of cutting out a portion of the image (thus, other portions are removed) and an original image and an image cut out through the clipping process have different image contents from each other when overall viewed. When the enlargement and reduction is performed, the original image and an image subjected to the enlargement and reduction have similar shapes to each other. However, since the pixels do not one-to-one correspond to each other, the image contents are different from each other. In this case, only a portion of the image represented by the PDL data is printed or an area of a further wide range including the image is printed and thus the image represented by the PDL data becomes different from the printed image. Accordingly, image density of the image represented by the PDL data may be very different from image density of the printed image. When there is such the instruction for the print options, the prior image density determination is set to be ineffective and image density information obtained by the image density calculation unit 224 of the normal processing unit 210 is supplied to the printing device 30.

In this description, the enlargement and reduction and the clipping are exemplified, but a case of a general print option in which a large difference in image density between an image obtained by rasterizing PDL data and an image of a physical page printed in practice is generated may be also similarly applied. When there is an instruction of a print option satisfying this condition except for the enlargement and reduction and the clipping, it is considered that the prior image density determination is set to be ineffective.

Figure 7:
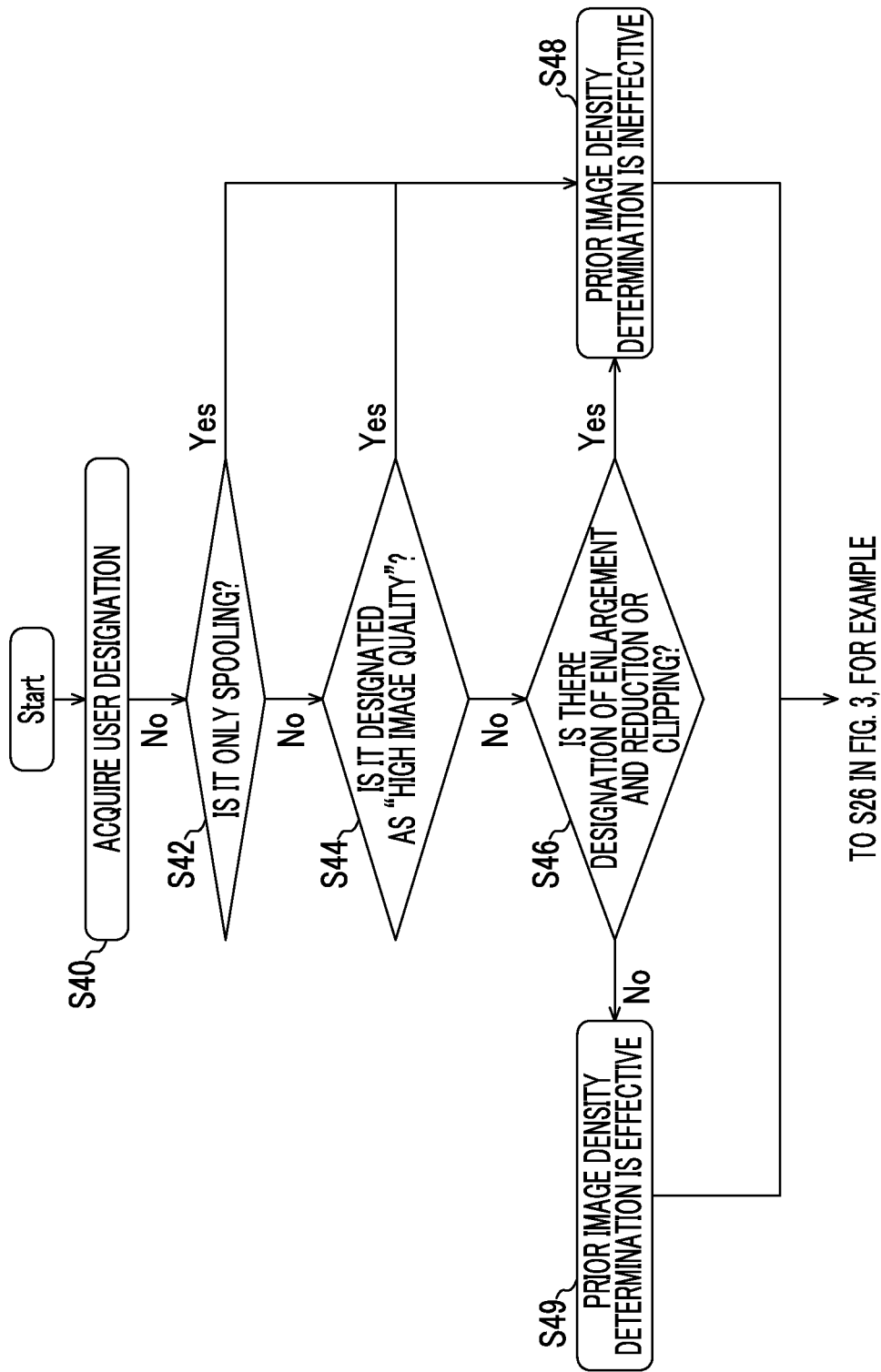
FIG. 7 is a diagram illustrating a third modification example that is a modification example regarding a determination procedure for effectiveness and ineffectiveness in prior image density determination.

FIG. 7 illustrates an example of a processing procedure of the mode determination unit 206 (in a case of the configuration in FIG. 2 and the like) or the mode determination unit 1206 (in a case of the configuration in FIG. 4) in the third modification example. In this procedure, first, the mode determination unit 206 or 1206 (see FIG. 2 and the like or see FIG. 4) receives information of designation details of a user with respect to a printing job to be executed from the user setting unit 208 or 1208 (S40). It is determined whether or not there is an instruction of the spooling mode (S42), whether or not there is an instruction for high image quality printing (for example, determination by comparing the designated image quality level to threshold) (S44), whether or not there is an instruction of the enlargement and reduction or the clipping (S46) based on the designation details. If determination result in at least one of S42 to S46 is positive (Yes), a flag of the prior image density determination is set to be "ineffective" (S48) and if the determination results in all of S42 to S46 are negative (No), the flag is set to be "effective" (S49). After S48 or S49, the rasterizing device 20 may execute, for example, a process of S26 in FIG. 3 and the subsequent processes.

In S46, determination whether or not a printing instruction from a user is an instruction of the enlargement and reduction and the clipping and indicates another type of print options in which a large difference in image density between an image obtained by rasterizing print data in the PDL and an actually printed image of a physical page is generated may be performed.

In the third modification example, determinations in S42 to S46 may be used along with determinations in S12, S16 and S20 of the procedures in FIG. 3. A process of the third modification example may be applied to anyone of the exemplary embodiments and the modification examples which are described above.

Fourth Modification Example

In the exemplary embodiments and the modification examples, once the prior image density determination is determined to be effective or ineffective, the determination result is held until the last of the job. On the contrary, a fourth modification example in which the prior image density determination is switched to be ineffective from being effective in accordance with a progress in execution of the job will be described below. The fourth modification example may be applied to all of the exemplary embodiments and the modification examples.

In the fourth modification example, when the prior image density determination is set to be effective as a result of determinations in S42 to S46 of procedures in FIG. 7, the printing device 30 controls the image forming process (for example, toner replenishing) at a first stage in a printing job by using image density information obtained by the prior image density determination unit 230. When a generation speed of print image data in the normal processing unit 210 is faster than the printing speed of the printing device 30, if a capacity (of a buffer memory, a secondary storage device, or the like) for storing the generated print image data is sufficient in the rasterizing device 20, print image data of pages of the number of preceding pages prior to a page in the process of being printed by the printing device 30 may be generated and stored. Until data of pages of the number of preceding pages prior to the page in the process of being printed is stored, the printing device 30 controls the image forming process in accordance with image density information from the prior image density determination unit 230 and the image density calculation unit 224 of the normal processing unit 210 calculates image density from the generated print image data of each page, associates the calculated image density with identification information of the page and stores the associated image density (for example, in the image density storage unit 225 in the example of FIG. 5). The prior image density determination unit 230 is caused to be ineffective and the stored image density information of the page is provided for the printing device 30 at a stage of storing print image data of pages corresponding to the number of preceding pages, prior to a page in the process of being printed. Then, image density of a new page is calculated from print image data and stored and the stored image density is transmitted to the printing device 30 in a turn of the page, each time the print image data of the new page is generated.

Print image data may be stored in the buffer memory 226 of the rasterizing device 20 when the capacity of the buffer memory 226 is equal to or more than a data amount of print image data of pages corresponding to the number of preceding pages. When the capacity of the buffer memory 226 is not equal to or more than the data amount of print image data of the pages, if the rasterizing device 20 has a spooling function of print image data, the generated print image data may be stored in a mode of spooling data in a secondary storage device such as a hard disk.

Figure 8:
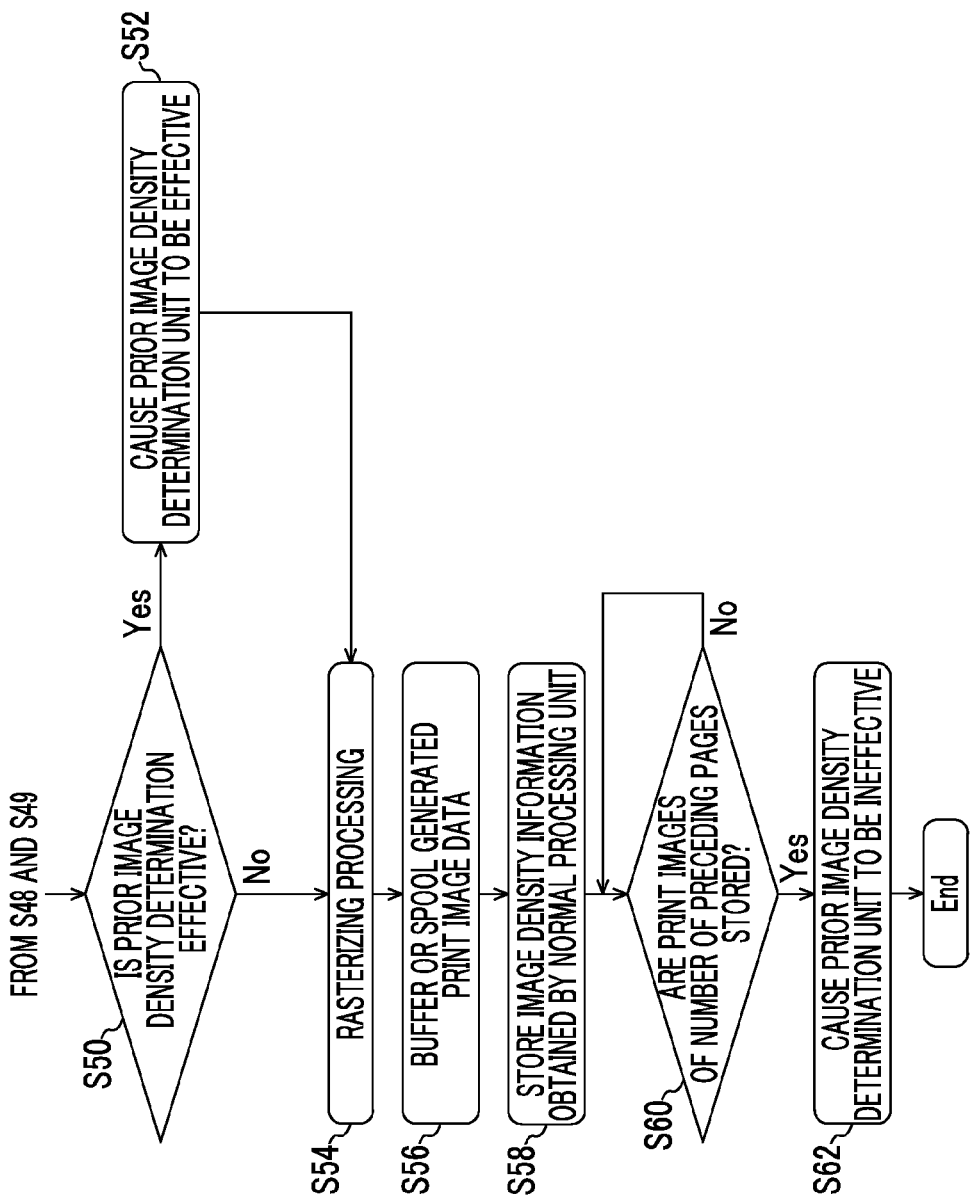
FIG. 8 is a diagram illustrating an example of procedures of switching effectiveness and ineffectiveness in prior image density determination in accordance with a progress of printing in a fourth modification example.

In the fourth modification example, the mode determination unit 206 or 1206 executes the procedures in FIG. 7 when a printing job is started and the process proceeds to procedures in FIG. 8 after S48 or S49. In the procedures of FIG. 8, first, it is determined which one of "effective" and "ineffective" the flag of the prior image density determination indicates (S50). If the flag indicates "effective", the prior image density determination unit 230 (in the example of FIG. 2 and the like) or the image density calculation unit 1234 (in the example of FIG. 4) is caused to be effective (S52) and the process proceeds to S54. When the flag of the prior image density determination indicates "ineffective", S52 is skipped and the process proceeds to S54. In S54, the normal processing unit 210 rasterizes (including the pre-process and the post-process) PDL data of the printing job in order from the forefront. The above-described processes in S50 to S54 are the same as the processes in S26, S28 and S32 of the procedures in FIG. 3. The print image data of each physical page generated by performing rasterizing is stored in the buffer memory 226 or a secondary storage device (below referred to as "a buffer or the like") (S56). The image density calculation unit 224 of the normal processing unit 210 calculates image density of the generated print image data, associates the calculated image density with the print image data (for example, associates the calculated image density with the page number of the print image data), and stores the associated image density (S58). Until the last of the PDL data, the processes in S56 and S58 are repeated. The print image data of each page is transmitted in order to the printing device 30 for continuing repetition, for example, each time a transmission request of the next page is received from the printing device 30.

When a speed at which the normal processing unit 210 generates print image data (the number of generated physical pages per unit time) is higher than the printing speed of the printing device 30, since writing data in the buffer or the like is faster than reading data from the buffer or the like, the number of pages of print image data stored in the buffer or the like increases. At a point in time at which the number of pages stored in the buffer or the like reaches the number of preceding pages, a page of highly accurate image density information which is stored in the rasterizing device 20 and is obtained from the print image data precedes a page in the process of being printed by the printing device 30 by the number of preceding pages. If a generation speed of print image data is faster than the printing speed, this preceding is held after that. Accordingly, after the point in time, the highly accurate image density information obtained from the print image data may be provided for the printing device 30 instead of the image density information obtained by the prior image density determination unit 230 while preceding of the number of preceding pages with respect to a page in the process of being printed is held.

In the fourth modification example, for example, the normal processing unit 210 monitors the number of pages of print image data stored in the buffer or the like and determines whether the number of pages reaches the number of preceding pages (S60). The number of pages of the print image data stored in the buffer or the like may be obtained, for example, by subtracting the number of pages of print image data transmitted from the normal processing unit 210 to the printing device 30 from the number of pages of print image data generated by the normal processing unit 210 (the number of physical pages). This determination is repeated in accordance with a predetermined rule, for example, regularly or each time print image data is generated.

If it is determined that the number of pages of print image data stored in the buffer or the like reaches the number of preceding pages in S60, the mode determination unit 206 (or 1206) switches the flag of the prior image density determination to "ineffective" (S62).

FIG. 9 illustrates procedures of transmission process of image density information to the printing device 30 from the rasterizing device 20 in the fourth modification example. These procedures are executed by, for example, the printing device control unit 204 or 1204.

In the procedures of FIG. 9, it is recognized that it is time to transmit image density information of the next page (S70).

In the normal state after the printing device 30 acquires once image density information of pages corresponding to the number of preceding pages prior to a page in the process of being printed, it is time to transmit image density information of the next page each time the printing device 30 completes printing of one page. That is, image density information (of a page corresponding to the number of preceding pages prior to "the next page") may be transmitted in the normal state in accordance with, for example, a notification from the printing device 30 indicating completion of printing one page or a time when a transmission request of print image data of the next page is received.

Image density information of pages corresponding to the number of preceding pages is supplied to the printing device 30 as fast as possible during a time period from a point in time of starting a printing job until the printing device 30 acquires image density information of pages corresponding to the number of preceding pages, prior to the page in the process of being printed. For this reason, it may be determined to be time to transmit information in S70 and image density information of a new page may be transmitted to the printing device 30 for example, each time the image density information of the new page is calculated.

If it is determined to be time to transmit image density information of the next page in S70, the rasterizing device 20 (for example, the printing device control unit 204 or 1204 in the rasterizing device 20) checks the flag of the prior image density determination (S72). If the flag is "effective", the rasterizing device 20 transmits image density information obtained by the prior image density determination unit 230 to the printing device 30 (S74). When the flag is determined to be "ineffective" in S72, the rasterizing device 20 transmits the precise image density information (of a page of the smallest page number among pieces of image density information of not-transmitted page stored in the image density storage unit 225) obtained by the image density calculation unit 224 of the normal processing unit 210 to the printing device 30 (S76).

According to the procedures in FIGS. 8 and 9, image density obtained by the prior image density determination unit 230 is supplied to the printing device 30 until generation of print image data by the rasterizing device 20 precedes printing in the printing device 30 by the number of preceding pages. Further, further highly accurate image density obtained by the normal processing unit 210 is supplied to the printing device 30 after generation of print image data by the rasterizing device 20 precedes printing in the printing device 30 by the number of preceding pages.

The printing device control unit 204 transmits print image data of the next page to the printing device 30 each time the printing device 30 prints one page, in parallel with performing the procedures in FIGS. 8 and 9. Transmission of print image data of a first page in a printing job may be started after image density information of pages corresponding to the number of preceding pages, from the first page is completed to be provided for the printing device 30. Accordingly, the image forming process may be controlled from printing of a first physical page in a printing job considering of image density of pages corresponding to the number of preceding pages. If the prior image density determination is "effective", the image density is calculated faster than in a case of "ineffective". Thus, a waiting time may be shorter than in the case of "ineffective" though start of printing the first page is caused to wait until transmission of image density of pages corresponding to the number of preceding pages is completed. When the capacity of the buffer memory 226 is smaller than an amount of print image data of pages corresponding to the number of preceding pages, the generated print image data may be spooled in a hard disk or the like until transmission of image density of pages corresponding to the number of preceding pages is completed.

In the above-described procedures of FIG. 8, switching of the prior image density determination flag is controlled using increase of the number of pages of print image data stored in the buffer or the like when a rasterizing speed is faster than the printing speed. As another example, for example, a processing load or a processing speed of the print data in the rasterizing process may be schematically calculated from a result of data analysis when the PDL print data is converted into intermediate data and switching of the prior image density determination flag may be controlled based on comparison of a result of schematic calculation with the printing speed of the printing device 30. That is, information having an influence on a processing load of rasterizing and the like performed by the normal processing unit 210 or the print image data generation unit 1210 may be obtained when PDL print data is analyzed. Examples of the information having the influence are the number of objects included in print data, complexity of shapes of the objects, a colored or monochrome object, presence or absence of a transparent effect, presence or absence of over printing, and the like. The processing load of the rasterizing process (including the pre-process and the post-process) may be schematically calculated from the information and the processing speed of the rasterizing process and the like may be schematically calculated from, for example, the processing load and computation performance of the normal processing unit 210 and the like. For example, it is determined whether or not a schematically calculated speed of the rasterizing process and the like is higher than the printing speed of the printing device 30. If the schematically calculated speed is higher, the flag of the prior image density determination is set to be "ineffective" and otherwise, the flag of the prior image density determination is set to be "effective". Instead of such simple comparison, the speed of the rasterizing process and the like may be compared to a result obtained by multiplying the printing speed by a predetermined constant of 1 or more.

In the exemplary embodiments and the modification examples which are described above, a process (referred to as "speed priority process") for obtaining image density based on a low resolution result obtained by performing rasterizing without both of the pre-process and the post-process is exemplified as a process of calculating image density faster than a process (referred to as "accuracy priority process") of calculating image density from print image data supplied to the printing device 30. However, this is only one example. Image density may also be calculated faster than a case of calculating image density from print image data in an intermediate process of these processes, that is, a process of calculating image density from a result obtained by performing rasterizing without one of the pre-process and the post-process.

In the processes of FIG. 3 and FIGS. 7 to 9 according to the exemplary embodiments and the modification examples, the intermediate process may be used as a processing process when the flag of the prior image density determination is "effective", instead of the speed priority process.

Fifth Modification Example

Three processes of the speed priority process, the intermediate process, and the accuracy priority process may be switched in accordance with designation from a user or a progress of a printing job. For example, when a printing job is started, if the speed priority process is selected by designation of a user (for example, an explicit selection from a user for the three processes, the spooling mode, designation of image quality, and the like; see FIG. 7), procedures similar to the procedures of FIG. 8 may be considered in which when an amount (the number of pages) of print image data stored in the buffer or the like is equal to or more than a first threshold, the process is switched to the intermediate process and when the amount is equal to or more than a second threshold which is larger than the first threshold, the process is switched to the accuracy priority process. As the second threshold, the number of preceding pages which is described above may be used. The mode determination unit 206 or 1206 may determine which one of these three processes is used.

When it is determined that there is an instruction of the enlargement and reduction, the clipping, or the page fitting, in S46 of the procedures in FIG. 7, particularly, a process of performing the pre-process out of the intermediate process may be selected instead of S48 (the prior image density determination being "ineffective"=the accuracy priority process). It is possible to obtain image density more accurate than that in speed priority process by obtaining image density from a rasterizing result through the pre-process such as the enlargement and reduction. Further it is possible to obtain image density further faster than the accuracy priority process by omitting the post-process. In this case, as in the procedures of FIG. 8, the process may be switched to the accuracy priority process at a point in time at which print image data of pages equal to or more than the number of preceding pages is stored in the buffer or the like.

For implementing a systematic configuration of switching the three processes of the speed priority process, the intermediate process, and the accuracy priority process and using the switched process, for example, the thumbnail generation unit 1050 may include a pre-processing unit 1070 and a post-processing unit 1072, as illustrated in FIG. 10. Components illustrated in FIG. 10, which are the same as the components illustrated in FIG. 4 (second exemplary embodiment) are denoted by the same reference numerals and the repetitive description will be omitted.

The pre-processing unit 1070 and the post-processing unit 1072 are modules for performing the same processes as those in the pre-processing unit 1212 of the print image data generation unit 1210 and the post-processing unit 1220. The thumbnail generation unit 1050 selectively causes one or both of the pre-processing unit 1070 and the post-processing unit 1072 to be ineffective in accordance with an instruction from the mode determination unit 1206. For example, when the speed priority process (prior image density determination="effective") is selected, the mode determination unit 1206 instructs the thumbnail generation unit 1050 that the pre-processing unit 1070 and the post-processing unit 1072 are caused to be ineffective and causes the image density calculation unit 1234 to be effective. With this, the image density calculation unit 1234 receives a rasterizing result which does not pass through the pre-processing unit 1070 and the post-processing unit 1072 from the rasterizer 1232 and calculates image density from the rasterizing result. The mode determination unit 1206 instructs the thumbnail generation unit 1050 that the pre-processing unit 1070 is caused to be effective and the post-processing unit 1072 is caused to be ineffective and causes the image density calculation unit 1234 to be effective when the intermediate process of performing only the pre-process is selected based on the designated print option and the like. Accordingly, the rasterizer 1232 rasterizes the intermediate data which is processed by the pre-processing unit 1070 in accordance with the designated print option (for example, the enlargement and reduction or the page fitting) and the image density calculation unit 1234 calculates image density from image data obtained from the rasterizing result. When the accuracy priority process is selected, the mode determination unit 1206 causes the image density calculation unit 1234 to be ineffective and thus causes the image density calculation unit 1234 not to calculate image density at a high speed based on a thumbnail. In this case, image density information calculated by the image density calculation unit 1224 of the print image data generation unit 1210 is provided for the printing device 30.

In the fifth modification example, the image density calculation unit 1234 may also calculate image density faster than calculating image density from print image data when both of the pre-processing unit 1070 and the post-processing unit 1072 of the thumbnail generation unit 1050 are caused to be effective. This is because since the rasterizer 1232 generates an image having a resolution lower than that of the print image data, a time for a calculation process of image density may be reduced due to the reduced number of pixels of the image. Accordingly, a process of causing both of the pre-processing unit 1070 and the post-processing unit 1072 to be effective may be used as the intermediate process.

In the fifth modification example, the intermediate process is added to the configuration of FIG. 4 (second exemplary embodiment using the thumbnail generation unit 1050). However, the same enlargement may be applied to the configuration illustrated in FIG. 2 (first exemplary embodiment using the prior image density determination unit 230).

Sixth Modification Example

As a sixth modification example, an example in which image density for each physical page and image density for each area in the physical page are obtained will be described. The area refers to an area of a portion of a physical page. For example, a physical page is divided into plural areas. The image density calculation units 224 and 234 (along with 1224 and 1234) also calculate image density for each of the divided areas and notify the printing device 30 of the calculated image density. The printing device 30 controls the image forming process based on the image density of a physical page and the image density of each area in the physical page. Information of the image density for each area is used for correction of unevenness in a surface, control of image registration, control of fixing, and the like in the electrophotographic process.

In a case of the configuration in which image density information for each area is transmitted to the printing device 30, for example, if page fitting for bookbinding is designated as a print option from a user, the speed priority process may not be selected as a process of calculating image density. In a case of page fitting for bookbinding, since an order of allocating a logical page on a physical page (a surface of folding) is different from an order of pages and there is a logical page allowable for being inverted up and down and allocated, it is difficult to obtain which portion of which logical page is included in each area. Accordingly, it is impossible or very difficult to obtain image density of each area in a physical page from image density of a logical page group obtained through the speed priority process (in this process, the page fitting process is not performed). When the page fitting for bookbinding is designated, it is easy to perform processing by obtaining image density of each area through the pre-processing unit 1070 and the like performing page fitting of a logical page group.

In the exemplary embodiments and the modification examples, the image density calculation unit 234 or 1234 and the image density calculation unit 224 or 1224 of the normal processing unit are separately used depending on circumstances. However, a systematic configuration may be applied in which the image density calculation unit 224 or 1224 is omitted and thus the image density calculation unit 234 or 1234 calculates image density at a high speed in any case.

In the exemplary embodiments and the modification examples, a device for rasterizing intermediate data calculates image density. However, the method of the exemplary embodiments may also be applied to a systematic configuration in which a device for rasterizing PDL data calculates image density. Since a processing load in a CPU and the like when intermediate data is rasterized is smaller than that when PDL data is directly rasterized, when the intermediate data is used, a negative effect having an influence on a processing speed is small even though both of the normal processing unit 210 and the prior image density determination unit 230 causes the rasterizers 218 and 232 to operate. Particularly, when an intermediate data format having a low load in rasterizing is used, two rasterizers being operated in parallel does not have a negative effect on a CPU and an advantage that a request of a memory capacity for establishing control of image forming process based on image density is reduced is large.

In the exemplary embodiments and the modification examples, printing device 30 performs the electrophotographic process. However, control in the exemplary embodiments may also be applied to the printing device 30 using a coloring material except for the toner, for example, an inkjet type device.

The rasterizing device 20 or the printing control system described above is realized by executing a program for processing of the respective function modules of the device in the general purpose computer, for example. The computer has a circuit configuration in which, as hardware, for example, a microprocessor such as a CPU, a memory (primary storage) such as a random access memory (RAM) and a read only memory (ROM), a secondary storage controller of controlling a secondary storage such as a hard disk drive (HDD), a solid state drive (SSD), a flash memory, various I/O (input and output) interfaces, a network interface for controlling connection to a wireless or wired network are connected to each other through a bus, for example. A disk drive, a memory reader and writer, and the like may be connected to the bus. The disk drive is used for performing reading and/or writing on a portable disk recording medium such as a CD, a DVD, a Blu-ray disk through the I/O interface, for example. The memory reader and writer is used for performing reading and/or writing on portable non-volatile recording media having various standards such as a flash memory. A program in which process details of the respective function modules which are described above are described is stored in a secondary storage device such as a flash memory and installed on a computer through a recording medium such as a CD and a DVD, or through a communication section such as a network. The above-described function module group is realized by reading the program stored in the secondary storage device to the RAM and the microprocessor such as a CPU executing the program.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
    a processor that acts as:
        a print image generation section that generates print image data to be stored in a memory or a secondary storage device and supplied to a printing device by executing a rasterizing process with a resolution for printing on print data;
        an image density calculation section that executes the rasterizing process on the print data with a resolution lower than the resolution for printing and calculates image density information used in control of an image forming process in the printing device based on raster image data which is generated through the rasterizing process and has a resolution lower than the resolution for printing,
        wherein a difference in a processing speed between the print image generation section and the image density calculation section causes the image density information of a preceding page prior to a page of the print image data being printed by the printing device to be supplied to the printing device;
        a second image density calculation section that calculates highly accurate image density information compared to the image density information calculated by the image density calculation section, based on the print image data generated by the print image generation section, the highly accurate image density information being density information having an accuracy greater than an accuracy of the image density information calculated by the image density calculation section, the highly accurate image density information being stored in the memory or the secondary storage device in association with the print image data; and
        a control section that controls which one of the image density information calculated by the image density calculation section and the highly accurate image density information calculated by the second image density calculation section is supplied to the printing device,
        wherein the processor acting as the control section controls a speed priority process for obtaining image density based on a low resolution result obtained by performing rasterizing without both of a pre-process and a post-process to thereby calculate image density faster than an accuracy priority process of calculating image density from the print image data supplied to the printing device,
        when the control section controls the speed priority process, the print image data stored in the memory or the secondary storage device is retrieved and supplied to the printing device, and the printing device prints the retrieved print image data using the image density information calculated by the image density calculation section, and
        when the control section controls the accuracy priority process, the print image data and the highly accurate image density information stored in the memory or the secondary storage device are retrieved and supplied to the printing device, and the printing device prints the retrieved print image data using the retrieved highly accurate image density information.

2. The image processing apparatus according to claim 1, further comprising:
    the processor acting as a display image data generation section that generates display image data having a resolution lower than a resolution of the print image data by executing the rasterizing process on the print data, wherein the image density calculation section calculates the image density information based on the display image data generated by the display image data generation section.

3. The image processing apparatus according to claim 2, wherein
the processor acting as the control section controls to determine whether or not reservable capacity of the memory for temporarily holding the print image data generated by the print image generation section is equal to or more than a volume necessary for holding print image data corresponding to a number of preceding pages indicating how many pages the printing device needs image density information of the pages after a page in the process of being printed in order to control the image forming process and controls to supply the highly accurate image density information calculated by the second image density calculation section to the printing device if the capacity of the memory is a necessary volume or more.

4. The image processing apparatus according to claim 3, wherein
the processor acting as the control section acquires performance information of the printing device and determines a number of preceding pages based on the acquired performance information.

5. The image processing apparatus according to claim 4, wherein
the processor acting as the control section controls to supply the highly accurate image density information calculated by the second image density calculation section to the printing device when being instructed to perform printing with image quality higher than reference image quality by a user.

6. The image processing apparatus according to claim 3, wherein
the processor acting as the control section controls to supply the highly accurate image density information calculated by the second image density calculation section to the printing device when being instructed to perform printing with image quality higher than reference image quality by a user.

7. The image processing apparatus according to claim 2, wherein
the processor acting as the control section controls to supply the highly accurate image density information calculated by the second image density calculation section to the printing device when being instructed to perform printing with image quality higher than reference image quality by a user.

8. The image processing apparatus according to claim 2, wherein
the processor acting as the control section controls to supply the highly accurate image density information calculated by the second image density calculation section to the printing device when being instructed of specified print option causing contents of an image to be changed based on the image corresponding to print data by a user.

9. The image processing apparatus according to claim 1, wherein
the processor acting as the control section controls to determine whether or not reservable capacity of the memory for temporarily holding the print image data generated by the print image generation section is equal to or more than a volume necessary for holding print image data corresponding to a number of preceding pages indicating how many pages the printing device needs image density information of the pages after a page in the process of being printed in order to control the image forming process and controls to supply the highly accurate image density information calculated by the second image density calculation section to the printing device if the capacity of the memory is a necessary volume or more.

10. The image processing apparatus according to claim 9, wherein
the processor acting as the control section acquires performance information of the printing device and determines a number of preceding pages based on the acquired performance information.

11. The image processing apparatus according to claim 10, wherein
the processor acting as the control section controls to supply the highly accurate image density information calculated by the second image density calculation section to the printing device when being instructed to perform printing with image quality higher than reference image quality by a user.

12. The image processing apparatus according to claim 9, wherein
the processor acting as the control section controls to supply the highly accurate image density information calculated by the second image density calculation section to the printing device when being instructed to perform printing with image quality higher than reference image quality by a user.

13. The image processing apparatus according to claim 1, wherein
the processor acting as the control section controls to supply the highly accurate image density information calculated by the second image density calculation section to the printing device when being instructed to perform printing with image quality higher than reference image quality by a user.

14. The image processing apparatus according to claim 1, wherein
the processor acting as the control section controls to supply the highly accurate image density information calculated by the second image density calculation section to the printing device when being instructed of specified print option causing contents of an image to be changed based on the image corresponding to print data by a user.

15. The image processing apparatus according of claim 1, wherein
the processor acting as the control section controls print image data generated by the print image generation section to be temporarily stored in the memory or the secondary storage device and controls the stored print image data to be supplied to the printing device in accordance with a progress of a printing process in the printing device, and
the processor acting as the control section also controls the second image density calculation section to calculate highly accurate image density information parallel with the storing and to supply when image density information generated by the image density calculation section is supplied to the printing device at the time of starting to print the print data, controls the generated highly accurate image density information to be stored with being associated with the print image data stored in the memory or the secondary storage device by the print image generation section, and controls to stop supplying the image density information to the printing device from the image density calculation section and to supply highly accurate image density information that is generated by the second image density calculation section and is image density information of a page before a number of preceding pages prior to a page in the process of being printed in the printing device to the printing device when a number of pages of the print image data generated by the print image generation section is equal to or more than a number of preceding pages more than a number of pages of print image data supplied to the printing device, the number of the preceding pages indicating how many pages the printing device needs image density information of the pages before a page in a process of being printed in order to control the image forming process.

16. The image processing apparatus according to claim 1, wherein
the processor acting as the control section controls image density information calculated by the image density calculation section to be supplied to the printing device by operating the image density calculation section and the second image density calculation section in parallel and controls highly accurate image density information calculated by the second image density calculation section to be stored when the print data is printed at first, and controls the stored highly accurate image density information to be supplied to the printing device when second and subsequent printings of the print data are printed.

17. The image processing apparatus according to claim 1, wherein
the processor acting as the control section determines whether or not a spooling mode in which the print image data generated based on the print data is not printed and stored at the time of being generated is designated and controls highly accurate image density information generated by the second image density calculation section to be associated with the print image data and be stored when it is determined that the spooling mode is designated.

18. The image processing apparatus according to claim 1, wherein
the processor acting as the control section supplies the highly accurate density information to the printing device when a generation speed of print image data is faster than the printing speed.

19. The image processing apparatus according to claim 1, wherein
the processor acting as the control section supplies the image density information obtained by the image density calculation section to the printing device until generation of print image data precedes printing in the printing device by the number of preceding pages.

20. A non-transitory computer readable medium storing a program for causing a computer to function as:
a print image generation section generates print image data to be stored in a memory or a secondary storage device and supplied to the printing device by executing a rasterizing process with a resolution for printing on print data;
an image density calculation section executes the rasterizing process on the print data with a resolution lower than the resolution for printing and calculates image density information used in control of an image forming process in the printing device based on raster image data which is generated through the rasterizing process and has a resolution lower than the resolution for printing,
wherein a difference in a processing speed between the print image generation section and the image density calculation section causes the image density information of a preceding page prior to a page of the print image data being printed by the printing device to be supplied to the printing device;
a second image density calculation section that calculates highly accurate image density information compared to the image density information calculated by the image density calculation section, based on the print image data generated by the print image generation section, the highly accurate image density information being density information having an accuracy greater than an accuracy of the image density information calculated by the image density calculation section, the highly accurate image density information being stored in the memory or the secondary storage device in association with the print image data; and
a control section that controls which one of the image density information calculated by the image density calculation section and the highly accurate image density information calculated by the second image density calculation section is supplied to the printing device,
wherein the computer functioning as the control section controls a speed priority process for obtaining image density based on a low resolution result obtained by performing rasterizing without both of a pre-process and a post-process to thereby calculate image density faster than an accuracy priority process of calculating image density from the print image data supplied to the printing device,
when the control section controls the speed priority process, the print image data stored in the memory or the secondary storage device is retrieved and supplied to the printing device, and the printing device prints the retrieved print image data using the image density information calculated by the image density calculation section, and
when the control section controls the accuracy priority process, the print image data and the highly accurate image density information stored in the memory or the secondary storage device are retrieved and supplied to the printing device, and the printing device prints the retrieved print image data using the retrieved highly accurate image density information.

\* \* \* \* \*